(12) United States Patent
Hindman

(10) Patent No.: US 7,805,542 B2
(45) Date of Patent: *Sep. 28, 2010

(54) MOBILE UNIT ATTACHED IN A MOBILE ENVIRONMENT THAT FULLY RESTRICTS ACCESS TO DATA RECEIVED VIA WIRELESS SIGNAL TO A SEPARATE COMPUTER IN THE MOBILE ENVIRONMENT

(75) Inventor: George W. Hindman, P.O. Box 143881, Austin, TX (US) 78714-3881

(73) Assignee: George W. Hindman, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/416,821

(22) Filed: May 3, 2006

(65) Prior Publication Data

US 2006/0200587 A1 Sep. 7, 2006

Related U.S. Application Data

(63) Continuation of application No. 09/956,182, filed on Sep. 19, 2001, now Pat. No. 7,165,123.

(60) Provisional application No. 60/038,078, filed on Feb. 25, 1997.

(51) Int. Cl.
*G06F 13/12* (2006.01)
*G06F 3/00* (2006.01)
*G01C 21/00* (2006.01)
*G06G 7/78* (2006.01)

(52) U.S. Cl. .................. 710/3; 710/2; 710/5; 710/62; 710/64; 701/29; 701/207; 701/211; 701/216; 701/217; 701/220; 709/217; 455/7; 455/67; 455/346; 455/560; 340/426.17; 340/426.18; 340/426.19; 340/426.2; 340/426.21; 340/426.22; 340/426.23; 340/426.24; 340/426.25; 340/5.65; 340/988

(58) Field of Classification Search ..................... 710/2, 710/3, 5, 62, 64; 701/29, 207, 211, 216, 701/217, 220; 709/217; 455/560, 67, 7
See application file for complete search history.

(56) References Cited

U.S. PATENT DOCUMENTS 3,594,495 A 7/1971 Bond (Continued)

FOREIGN PATENT DOCUMENTS

EP 0 286 600 A2 10/1988

(Continued)

OTHER PUBLICATIONS

Anderson, "FireWire® System Architecture," Second Edition IEEE 1394a, MindShare, Inc., Addison-Wesley, pp. 305-326, Mar. 1, 2001.

(Continued)

*Primary Examiner*—Tammara Peyton
(74) *Attorney, Agent, or Firm*—Lila B. Glaser; Sprinkle IP Law Group

(57) ABSTRACT

Embodiments disclosed herein provide for an apparatus and method for input/output management in a mobile environment. One embodiment includes a mobile unit comprising at least one processor, a data bus interface and a computer readable memory persistently storing a unique hardware identification. The mobile unit can receive a wireless signal and, based on the wireless signal, communicate a set of data across the data bus. The persistent unique hardware identification of the mobile unit is used to restrict access to data received at the mobile unit via the wireless signal.

16 Claims, 8 Drawing Sheets

U.S. PATENT DOCUMENTS

| | | |
|---|---|---|
| 4,068,175 A | 1/1978 | Maniaci |
| 4,086,627 A | 4/1978 | Bennett et al. |
| 4,087,855 A | 5/1978 | Bennett et al. |
| 4,204,256 A | 5/1980 | Klotzner |
| 4,231,087 A | 10/1980 | Hunsberger et al. |
| 4,232,313 A | 11/1980 | Fleishman |
| 4,245,301 A | 1/1981 | Rokutanda et al. |
| 4,245,307 A | 1/1981 | Kapeghian et al. |
| 4,263,650 A | 4/1981 | Bennett et al. |
| 4,292,650 A | 9/1981 | Hendrickson |
| 4,361,876 A | 11/1982 | Groves |
| 4,363,340 A | 12/1982 | Naftulin |
| 4,393,498 A | 7/1983 | Jackson et al. |
| 4,430,584 A | 2/1984 | Someshwar et al. |
| 4,432,064 A | 2/1984 | Barker et al. |
| 4,433,379 A | 2/1984 | Schenk et al. |
| 4,434,461 A | 2/1984 | Puhl |
| 4,454,591 A | 6/1984 | Lou |
| 4,455,647 A | 6/1984 | Gueldner |
| 4,456,793 A | 6/1984 | Baker et al. |
| 4,456,966 A | 6/1984 | Bringol et al. |
| 4,463,340 A | 7/1984 | Adkins et al. |
| 4,486,853 A | 12/1984 | Parsons |
| 4,511,966 A | 4/1985 | Hamada |
| 4,513,405 A | 4/1985 | Hills |
| 4,517,561 A | 5/1985 | Burke et al. |
| 4,518,961 A | 5/1985 | Davis et al. |
| 4,538,262 A | 8/1985 | Sinniger et al. |
| 4,539,655 A | 9/1985 | Trussell et al. |
| 4,577,060 A | 3/1986 | Webb et al. |
| 4,583,170 A | 4/1986 | Carlin et al. |
| 4,584,603 A | 4/1986 | Harrison |
| RE32,156 E | 5/1986 | Tokuda |
| 4,590,473 A | 5/1986 | Burke et al. |
| 4,594,591 A | 6/1986 | Burke |
| 4,611,198 A * | 9/1986 | Levinson et al. ....... 340/539.11 |
| 4,613,901 A | 9/1986 | Gilhousen et al. |
| 4,637,022 A | 1/1987 | Burke et al. |
| 4,672,480 A | 6/1987 | Yamamoto |
| 4,677,434 A | 6/1987 | Fascenda |
| 4,684,941 A | 8/1987 | Smith et al. |
| 4,704,696 A | 11/1987 | Reimer et al. |
| 4,715,031 A | 12/1987 | Crawford et al. |
| 4,731,613 A | 3/1988 | Endo et al. |
| 4,731,769 A | 3/1988 | Schaefer et al. |
| 4,739,510 A | 4/1988 | Jeffers et al. |
| 4,751,512 A | 6/1988 | Longaker |
| 4,751,633 A | 6/1988 | Henn et al. |
| 4,757,456 A | 7/1988 | Benghiat |
| 4,758,959 A | 7/1988 | Thoone et al. |
| 4,775,928 A | 10/1988 | Kendall et al. |
| 4,777,590 A | 10/1988 | Durkos et al. |
| 4,787,040 A | 11/1988 | Ames et al. |
| 4,792,986 A | 12/1988 | Garner et al. |
| 4,793,510 A | 12/1988 | Arfert et al. |
| 4,796,191 A | 1/1989 | Honey et al. |
| 4,802,172 A | 1/1989 | Fukami et al. |
| 4,809,217 A | 2/1989 | Floro et al. |
| 4,827,520 A | 5/1989 | Zeinstra |
| 4,837,800 A | 6/1989 | Freeburg et al. |
| 4,845,491 A | 7/1989 | Fascenda et al. |
| 4,845,667 A | 7/1989 | Hoptner et al. |
| 4,866,515 A | 9/1989 | Tagawa et al. |
| 4,866,732 A | 9/1989 | Carey et al. |
| 4,870,403 A | 9/1989 | Mori et al. |
| 4,870,704 A | 9/1989 | Matelan et al. |
| 4,884,204 A | 11/1989 | Seibt et al. |
| 4,887,296 A | 12/1989 | Horne |
| 4,887,311 A | 12/1989 | Garner et al. |
| 4,903,262 A | 2/1990 | Dissosway et al. |
| 4,908,792 A | 3/1990 | Przybyla et al. |
| 4,933,963 A | 6/1990 | Sato et al. |
| 4,937,753 A | 6/1990 | Yamada |
| 4,943,919 A | 7/1990 | Aslin et al. |
| 4,953,198 A | 8/1990 | Daly et al. |
| 4,972,457 A | 11/1990 | O'Sullivan |
| 4,998,252 A | 3/1991 | Suzuki et al. |
| 4,998,291 A | 3/1991 | Marui et al. |
| 5,020,135 A | 5/1991 | Kasparian |
| 5,036,466 A | 7/1991 | Fitzgerald et al. |
| 5,036,537 A | 7/1991 | Jeffers et al. |
| 5,043,721 A | 8/1991 | May |
| 5,045,848 A | 9/1991 | Fascenda |
| 5,046,011 A | 9/1991 | Kakihara et al. |
| 5,046,082 A | 9/1991 | Zicker et al. |
| 5,060,260 A | 10/1991 | O'Connell |
| 5,060,264 A | 10/1991 | Muellner et al. |
| 5,070,499 A | 12/1991 | Maher et al. |
| 5,091,847 A | 2/1992 | Herbermann |
| 5,093,801 A | 3/1992 | White et al. |
| 5,099,444 A | 3/1992 | Wilson et al. |
| 5,101,478 A | 3/1992 | Fu et al. |
| 5,101,500 A | 3/1992 | Marul |
| 5,109,543 A * | 4/1992 | Dissosway et al. ....... 455/170.1 |
| 5,111,402 A | 5/1992 | Brooks |
| 5,113,410 A | 5/1992 | Hamano et al. |
| 5,119,102 A | 6/1992 | Barnard |
| 5,119,504 A | 6/1992 | Durboraw, III |
| 5,127,057 A | 6/1992 | Chapman |
| 5,142,576 A | 8/1992 | Nadan |
| 5,144,649 A | 9/1992 | Zicker et al. |
| 5,152,482 A | 10/1992 | Perkins et al. |
| 5,155,689 A | 10/1992 | Wortham |
| 5,170,401 A | 12/1992 | Mohr |
| 5,181,201 A | 1/1993 | Schauss et al. |
| 5,184,312 A | 2/1993 | Ellis |
| 5,203,020 A | 4/1993 | Sato et al. |
| 5,223,844 A | 6/1993 | Mansell et al. |
| 5,224,124 A | 6/1993 | Hamano et al. |
| 5,227,614 A | 7/1993 | Danielson et al. |
| 5,229,648 A | 7/1993 | Sues et al. |
| 5,239,670 A | 8/1993 | Schwendeman et al. |
| 5,241,305 A | 8/1993 | Fascenda et al. |
| 5,247,564 A | 9/1993 | Zicker |
| 5,247,565 A | 9/1993 | Joglekar et al. |
| 5,253,129 A | 10/1993 | Blackborow et al. |
| 5,265,093 A | 11/1993 | Dissosway et al. |
| 5,271,582 A | 12/1993 | Perkins et al. |
| 5,276,451 A | 1/1994 | Odagawa |
| 5,276,561 A | 1/1994 | Fukami |
| 5,280,281 A | 1/1994 | Shimotsuma et al. |
| 5,286,195 A | 2/1994 | Clostermann |
| 5,289,378 A | 2/1994 | Miller et al. |
| 5,295,178 A | 3/1994 | Nickel et al. |
| 5,295,258 A | 3/1994 | Jewett et al. |
| 5,297,142 A | 3/1994 | Paggeot et al. |
| 5,297,203 A | 3/1994 | Rose et al. |
| 5,299,132 A | 3/1994 | Wortham |
| 5,303,393 A | 4/1994 | Noreen et al. |
| 5,305,355 A | 4/1994 | Go et al. |
| 5,307,399 A | 4/1994 | Dai et al. |
| 5,307,456 A | 4/1994 | MacKay |
| 5,307,505 A | 4/1994 | Houlberg et al. |
| 5,317,691 A | 5/1994 | Traeger |
| 5,321,750 A | 6/1994 | Nadan |
| 5,325,082 A | 6/1994 | Rodriguez |
| 5,325,359 A | 6/1994 | Jordan et al. |
| 5,333,176 A | 7/1994 | Burke et al. |
| 5,333,177 A | 7/1994 | Braitberg et al. |
| 5,334,974 A | 8/1994 | Simms et al. |
| 5,334,986 A | 8/1994 | Fernhout |
| 5,337,243 A | 8/1994 | Shibata et al. |
| 5,341,041 A | 8/1994 | El Gamal |
| 5,345,227 A | 9/1994 | Fascenda et al. |

| | | | | | |
|---|---|---|---|---|---|
| 5,347,480 A | 9/1994 | Asghar et al. | 5,557,524 A | 9/1996 | Maki |
| 5,351,041 A | 9/1994 | Ikata et al. | 5,559,707 A | 9/1996 | DeLorme et al. |
| 5,353,417 A | 10/1994 | Fuoco et al. | 5,561,853 A | 10/1996 | Pfundstein |
| 5,359,521 A | 10/1994 | Kyrtsos et al. | 5,563,453 A | 10/1996 | Nyfelt |
| 5,371,737 A | 12/1994 | Nelson et al. | 5,568,645 A | 10/1996 | Morris et al. |
| 5,371,858 A | 12/1994 | Miller et al. | 5,572,442 A | 11/1996 | Schulhof et al. |
| 5,386,363 A | 1/1995 | Haak et al. | 5,572,528 A | 11/1996 | Shuen |
| 5,386,435 A | 1/1995 | Cooper et al. | 5,574,514 A | 11/1996 | Tanihira et al. |
| 5,390,356 A | 2/1995 | Houlberg et al. | 5,579,489 A | 11/1996 | Dornier et al. |
| 5,396,431 A | 3/1995 | Shimizu et al. | 5,581,599 A | 12/1996 | Tsuji et al. |
| 5,398,190 A | 3/1995 | Wortham | 5,583,562 A | 12/1996 | Birch et al. |
| 5,398,285 A | 3/1995 | Borgelt et al. | 5,586,275 A | 12/1996 | Ehlig et al. |
| 5,399,810 A | 3/1995 | Hayami | 5,590,195 A | 12/1996 | Ryan |
| 5,404,463 A | 4/1995 | McGarvey | 5,594,779 A | 1/1997 | Goodman |
| 5,406,626 A | 4/1995 | Ryan | 5,594,797 A | 1/1997 | Alanara et al. |
| 5,408,250 A | 4/1995 | Bier | 5,596,756 A | 1/1997 | O'Brien |
| 5,420,860 A | 5/1995 | Stevens et al. | 5,600,800 A | 2/1997 | Kikinis et al. |
| 5,422,656 A | 6/1995 | Allard et al. | 5,610,821 A | 3/1997 | Gazis et al. |
| 5,422,812 A | 6/1995 | Knoll et al. | 5,610,822 A | 3/1997 | Murphy |
| 5,430,663 A | 7/1995 | Judd et al. | 5,617,559 A | 4/1997 | Le et al. |
| 5,440,632 A | 8/1995 | Bacon et al. | 5,619,687 A | 4/1997 | Langan et al. |
| 5,442,305 A | 8/1995 | Martin et al. | 5,621,800 A | 4/1997 | Weng et al. |
| 5,446,759 A | 8/1995 | Campana, Jr. | 5,623,260 A | 4/1997 | Jones |
| 5,448,218 A | 9/1995 | Espinosa | 5,625,350 A | 4/1997 | Fukatsu et al. |
| 5,448,561 A | 9/1995 | Kaiser et al. | 5,625,795 A | 4/1997 | Sakakura et al. |
| 5,450,560 A | 9/1995 | Bridges et al. | 5,627,547 A | 5/1997 | Ramaswamy et al. |
| 5,455,823 A | 10/1995 | Noreen | 5,637,928 A | 6/1997 | Nakajima et al. |
| 5,455,863 A | 10/1995 | Brown et al. | 5,638,272 A | 6/1997 | Minowa et al. |
| 5,457,629 A | 10/1995 | Miller et al. | 5,640,684 A * | 6/1997 | Konosu et al. ............. 455/67.7 |
| 5,459,660 A | 10/1995 | Berra | 5,648,990 A | 7/1997 | Kraul et al. |
| 5,465,288 A | 11/1995 | Falvey et al. | 5,649,159 A | 7/1997 | Le et al. |
| 5,479,157 A | 12/1995 | Suman et al. | 5,650,770 A | 7/1997 | Schlager et al. |
| 5,479,479 A | 12/1995 | Braitberg et al. | 5,652,707 A | 7/1997 | Wortham |
| 5,481,709 A | 1/1996 | Bealkowski et al. | 5,652,795 A | 7/1997 | Dillon et al. |
| 5,487,181 A | 1/1996 | Dailey et al. | 5,655,147 A | 8/1997 | Stuber et al. |
| 5,488,558 A | 1/1996 | Ohki | 5,659,595 A | 8/1997 | Chanu et al. |
| 5,488,575 A | 1/1996 | Danielson et al. | 5,659,690 A | 8/1997 | Stuber et al. |
| 5,490,064 A | 2/1996 | Minowa et al. | 5,668,875 A | 9/1997 | Brown et al. |
| 5,491,495 A | 2/1996 | Ward et al. | 5,671,374 A | 9/1997 | Postman et al. |
| 5,499,295 A | 3/1996 | Cooper et al. | 5,673,305 A * | 9/1997 | Ross ......................... 455/517 |
| 5,504,482 A | 4/1996 | Schreder | 5,675,830 A | 10/1997 | Satula |
| 5,504,684 A | 4/1996 | Lau et al. | 5,680,633 A | 10/1997 | Koenck et al. |
| 5,506,563 A | 4/1996 | Jonic | 5,689,245 A | 11/1997 | Noreen et al. |
| 5,508,928 A | 4/1996 | Tran | 5,689,568 A | 11/1997 | Laborde |
| 5,508,940 A | 4/1996 | Rossmere et al. | 5,694,318 A | 12/1997 | Miller et al. |
| 5,510,775 A | 4/1996 | Loncle | 5,697,048 A | 12/1997 | Kimura |
| 5,511,182 A | 4/1996 | Le et al. | 5,699,384 A | 12/1997 | Dillon |
| 5,511,229 A | 4/1996 | Tsujimoto | 5,699,430 A | 12/1997 | Krizay et al. |
| 5,513,111 A | 4/1996 | Wortham | 5,699,685 A | 12/1997 | Jahrsetz et al. |
| 5,515,303 A | 5/1996 | Cargin, Jr. et al. | 5,706,334 A | 1/1998 | Balk et al. |
| 5,519,410 A | 5/1996 | Smalanskas et al. | 5,714,948 A | 2/1998 | Farmakis et al. |
| 5,519,621 A | 5/1996 | Wortham | 5,719,943 A | 2/1998 | Amada et al. |
| 5,522,089 A | 5/1996 | Kikinis | 5,722,069 A | 2/1998 | Donner |
| 5,524,051 A | 6/1996 | Ryan | 5,724,316 A | 3/1998 | Brunts |
| 5,524,267 A | 6/1996 | Chin et al. | 5,724,604 A | 3/1998 | Moyer |
| 5,531,853 A | 7/1996 | Cubow et al. | 5,726,541 A | 3/1998 | Glenn et al. |
| 5,533,097 A | 7/1996 | Crane et al. | 5,731,785 A | 3/1998 | Lemelson et al. |
| 5,535,396 A | 7/1996 | Cohen et al. | 5,732,074 A | 3/1998 | Spaur et al. |
| 5,535,430 A | 7/1996 | Aoki et al. | 5,734,981 A | 3/1998 | Kennedy, III et al. |
| 5,535,436 A | 7/1996 | Yoshida et al. | 5,748,147 A | 5/1998 | Bickley et al. |
| 5,539,429 A | 7/1996 | Yano et al. | 5,754,953 A | 5/1998 | Briancon et al. |
| 5,539,810 A | 7/1996 | Kennedy, III et al. | 5,764,918 A | 6/1998 | Poulter |
| 5,544,225 A | 8/1996 | Kennedy, III et al. | 5,771,455 A | 6/1998 | Kennedy, III et al. |
| 5,546,273 A | 8/1996 | Harris | 5,774,804 A | 6/1998 | Williams |
| 5,548,163 A | 8/1996 | French | 5,774,828 A | 6/1998 | Brunts et al. |
| 5,548,814 A | 8/1996 | Lorang et al. | 5,777,580 A | 7/1998 | Janky et al. |
| 5,548,828 A | 8/1996 | Kozaki et al. | 5,786,789 A | 7/1998 | Janky |
| 5,550,804 A | 8/1996 | Haussler et al. | 5,787,080 A | 7/1998 | Hulyalkar et al. |
| 5,551,068 A | 8/1996 | Goldsmith et al. | 5,787,259 A | 7/1998 | Haroun et al. |
| 5,552,989 A | 9/1996 | Bertrand | 5,787,298 A | 7/1998 | Broedner et al. |
| 5,555,172 A | 9/1996 | Potter | 5,789,690 A | 8/1998 | Furuhashi et al. |
| 5,555,502 A | 9/1996 | Opel | 5,790,423 A | 8/1998 | Lau |
| 5,557,254 A | 9/1996 | Johnson et al. | 5,793,866 A | 8/1998 | Brown et al. |

| | | |
|---|---|---|
| 5,793,993 A | 8/1998 | Broedner et al. |
| 5,794,164 A | 8/1998 | Beckert et al. |
| 5,794,165 A | 8/1998 | Minowa et al. |
| 5,797,088 A | 8/1998 | Stamegna |
| 5,805,055 A * | 9/1998 | Colizza ............ 340/426.25 |
| 5,808,564 A | 9/1998 | Simms et al. |
| 5,809,472 A | 9/1998 | Morrison |
| 5,815,580 A | 9/1998 | Craven et al. |
| 5,815,671 A | 9/1998 | Morrison et al. |
| 5,821,631 A | 10/1998 | Loraas et al. |
| 5,822,691 A | 10/1998 | Hosseini |
| 5,826,195 A | 10/1998 | Westerlage et al. |
| 5,828,899 A | 10/1998 | Richard et al. |
| 5,832,394 A | 11/1998 | Wortham |
| 5,835,487 A | 11/1998 | Campanella |
| 5,835,535 A | 11/1998 | Patel et al. |
| 5,835,733 A | 11/1998 | Walsh et al. |
| 5,835,785 A | 11/1998 | Overtoom et al. |
| 5,835,858 A | 11/1998 | Vaijoja et al. |
| 5,841,774 A | 11/1998 | Flinck et al. |
| 5,842,125 A | 11/1998 | Modzelesky et al. |
| 5,848,360 A | 12/1998 | O'Connell et al. |
| 5,848,367 A | 12/1998 | Lotocky et al. |
| 5,854,591 A | 12/1998 | Atkinson |
| 5,856,975 A | 1/1999 | Rostoker et al. |
| 5,864,753 A | 1/1999 | Morita et al. |
| 5,870,018 A | 2/1999 | Person et al. |
| 5,870,390 A | 2/1999 | Campanella |
| 5,875,178 A | 2/1999 | Rahuel et al. |
| 5,875,312 A | 2/1999 | Walsh et al. |
| 5,878,339 A | 3/1999 | Zicker et al. |
| 5,878,839 A | 3/1999 | Lin |
| 5,884,219 A | 3/1999 | Curtwright et al. |
| 5,884,221 A | 3/1999 | Wortham |
| 5,887,269 A | 3/1999 | Brunts et al. |
| 5,890,005 A | 3/1999 | Lindholm |
| 5,896,418 A | 4/1999 | Hamano et al. |
| 5,898,831 A | 4/1999 | Hall et al. |
| 5,907,293 A | 5/1999 | Tognazzini |
| 5,909,183 A | 6/1999 | Borgstahl et al. |
| 5,915,001 A | 6/1999 | Uppaluru |
| 5,917,405 A * | 6/1999 | Joao ............ 340/426.17 |
| 5,918,064 A | 6/1999 | Miller et al. |
| 5,918,189 A | 6/1999 | Kivela |
| 5,926,624 A | 7/1999 | Katz |
| 5,936,949 A | 8/1999 | Pasternak et al. |
| 5,950,161 A | 9/1999 | Kozuma |
| 5,956,629 A | 9/1999 | Morrison |
| 5,960,074 A | 9/1999 | Clark |
| 5,963,872 A | 10/1999 | Stein |
| 5,969,668 A | 10/1999 | Young, Jr. |
| 5,970,144 A | 10/1999 | Chan et al. |
| 5,978,859 A | 11/1999 | Sademaa |
| 5,982,881 A | 11/1999 | Mischenko |
| 5,983,117 A | 11/1999 | Sandler et al. |
| 5,991,637 A | 11/1999 | Mack, II et al. |
| 6,009,363 A | 12/1999 | Beckert et al. |
| 6,028,537 A | 2/2000 | Suman et al. |
| 6,046,687 A * | 4/2000 | Janky ............ 340/988 |
| 6,049,876 A | 4/2000 | Moughanni et al. |
| 6,058,422 A | 5/2000 | Ayanoglu et al. |
| 6,064,335 A | 5/2000 | Eschenbach |
| 6,072,994 A | 6/2000 | Phillips et al. |
| 6,079,001 A | 6/2000 | Le et al. |
| 6,104,316 A | 8/2000 | Behr et al. |
| 6,122,523 A | 9/2000 | Zicker et al. |
| 6,131,051 A | 10/2000 | Beckert et al. |
| 6,140,935 A | 10/2000 | Hayton et al. |
| 6,148,202 A | 11/2000 | Wortham |
| 6,164,547 A | 12/2000 | Vapaakoski et al. |
| 6,182,104 B1 | 1/2001 | Foster et al. |
| 6,188,899 B1 | 2/2001 | Chatterjee et al. |
| 6,233,506 B1 * | 5/2001 | Obradovich et al. ............ 701/1 |
| 6,240,295 B1 | 5/2001 | Kennedy, III et al. |
| 6,249,514 B1 | 6/2001 | Campanella |
| 6,272,359 B1 | 8/2001 | Kivela et al. |
| 6,295,449 B1 | 9/2001 | Westerlage et al. |
| 6,301,560 B1 | 10/2001 | Masters |
| 6,324,405 B1 | 11/2001 | Young et al. |
| 6,324,592 B1 | 11/2001 | Hindman |
| 6,330,244 B1 | 12/2001 | Swartz et al. |
| 6,490,445 B1 | 12/2002 | Holmes |
| 6,529,731 B2 | 3/2003 | Modzelesky et al. |
| 6,539,212 B1 | 3/2003 | Kamalski |
| 6,539,438 B1 | 3/2003 | Ledzius et al. |
| 6,754,477 B2 | 6/2004 | Kamalski |
| 7,031,272 B2 | 4/2006 | Campanella |
| 7,146,156 B2 | 12/2006 | Zicker et al. |
| 7,165,123 B2 | 1/2007 | Hindman |
| 7,527,288 B2 * | 5/2009 | Breed ............ 280/735 |

FOREIGN PATENT DOCUMENTS

| | | |
|---|---|---|
| EP | 0 569 243 A1 | 11/1993 |
| GB | 2 241 096 A | 8/1991 |
| JP | 7192442 | 7/1995 |
| JP | 7192445 | 7/1995 |
| WO | WO 99/21094 | 4/1999 |

OTHER PUBLICATIONS

"IEEE Standard for a High Performance Serial Bus," Microproessor and Microcomputer Standards Committee of the IEEE Computer Society, pp. 35-38, Jul. 22, 1996.

Kaplan, "Wiley Electrical and Electronics Engineering Dictionary," pp. 517, 550, and 688, Jan. 22, 2004.

Sirius Satellite Radio Inc.'s Invalidity Contentions for U.S. Patent No. 7,165,123; Civil Action No. 2:07-CV-61 (TJW); 133 pages.

Exhibit 1—Claim Chart Re: U.S. Pat No. 6,324,592—U.S. Pat. No. 5,223,844 ("Mansell / Auto Trac"); 19 pages.

Exhibit 2—Claim Chart Re: U.S. Pat. No. 6,324,592—U.S. Pat. 5,334,974 ("Simms Patent"); 20 pages.

Exhibit 3—Claim Chart Re: U.S. Pat. No. 6,324,592—U.S. Pat. No. 5,404,463 ("McGarvey/Kodak"); 13 pages.

Exhibit 4—Claim Chart Re: U.S. Pat. No. 6,324,592—U.S. Pat. No. 5,508,928 ("Tran / Honeywell Patent"), 31 pages.

Exhibit 5—Claim Chart Re: U.S. Pat. No. 6,324,592—U.S. Pat. No. 5,557,254 ("Johnson Patent"); 27 pages.

Exhibit 6—Claim Chart Re: U.S. Pat. No. 6,324,592—U.S. Pat. No. 5,488,558 ("Ohki"), 68 pages.

Exhibit 7—Claim Chart Re: U.S. Pat. No. 6,324,592—U.S. Pat. No. 5,091,847 ("Herbermann / Grumann Aerospace"); 52 pages.

Exhibit 8—Claim Chart Re: U.S. Pat. No. 6,324,592—U.S. Pat. No. 5,627,547 ("Ramaswamy / Delco"); 45 pages.

Exhibit 9—Claim Chart Re: U.S. Pat. No. 6,324,592—U.S. Pat. No. 6,324,592 ("Krantz Reference"); 17 pages.

Exhibit 10—Claim Chart Re: U.S. Pat No. 6,324,592—U.S. Pat. No. 6,072,994 ("Phillips/Northrup" Patent); 38 pages.

Exhibit 11—Claim Chart Re: U.S. Pat. No. 6,324,592—U.S. Pat. No. 5,625,350 ("Fukatsu / Alpine Electronics"); 104 pages.

Exhibit 12—Claim Chart Re: U.S. Pat No. 6,324,592—U.S. Pat. No. 5,794,164 ("Berkert/Microsoft"); 45 pages.

Exhibit 13—Claim Chart Re: U.S. Pat. No. 6,324,592—EP Pat. No. EP 0 569 243 ("Pioneer Patent"); 22 pages.

Exhibit 14—Claim Chart Re: U.S. Pat No. 6,324,592—Kodak DCS Manual ("Kodak DCS Manual"); 17 pages.

Exhibit 15—Claim Chart Re: U.S. Pat No. 6,324,592—Hopkins et al. (the "Hopkins Reference"); 27 pages.
Exhibit 16—Claim Chart Re: U.S. Pat No. 6,324,592—U.S. Pat. No. 4,677,434 ("Fascenda"); 36 pages.
Exhibit 17—Claim Chart Re: U.S. Pat No. 6,324,592—U.S. Pat. No. 5,648,990 ("Kraul/Motorola"); 45 pages.
Exhibit 18—Claim Chart Re: U.S. Pat No. 6,324,592—U.S. Pat. No. 5,652,795 ("Dillon/Hughes Electronics"); 36 pages.
Exhibit 19—Claim Chart Re: U.S. Pat No. 6,324,592—U.S. Pat. No. 5,754,953 ("Briancon"); 29 pages.
Exhibit 20—Claim Chart Re: U.S. Pat No. 6,324,592—U.S. Pat. No. 5,731,785 ("Lemelson"); 16 pages.
Exhibit 21—Claim Chart Re: U.S. Pat No. 7,165,123—U.S. Pat. No. 6,058,422 ("Ayanoglu/Lucent"); 34 pages.
Exhibit 22—Claim Chart Re: U.S. Pat No. 7,165,123—U.S. Pat. No. 6,164,547 ("Vapaakoski"); 17 pages.
Exhibit 23—Claim Chart Re: U.S. Pat No. 7,165,123—U.S. Pat. No. 6,272,359 ("Kivela/Nokia"); 29 pages.
Exhibit 24—Claim Chart Re: U.S. Pat No. 7,165,123—U.S. Pat. No. 5,815,671 ("Morrison"); 47 pages.
Exhibit 25—Claim Chart Re: U.S. Pat No. 7,165,123—U.S. Pat. No. 5,524,051 ("Ryan"); 35 pages.
Exhibit 26—Claim Chart Re: U.S. Pat No. 7,165,123—U.S. Pat. No. 5,499,295 ("Copper"); 26 pages.
Exhibit 27—Claim Chart Re: U.S. Pat No. 7,165,123—Int'l Pub. No. WO 99/21094 ("Ledzius"); 43 pages.
Hopkins, et al, "FTMP—A Highly Reliable Fault-Tolerant Multiprocessor for Aircraft," Proceedings of the IEEE, vol. 66, No. 10, Oct. 1978.
Krantz, D. G. "*The Howitzer Improvement Program: Lessons Learned,*" Ordnance Division, Honeywell Inc., pp. 4-18, 1989.
*User's Manual—Kodak Professional Digital Camera System*, Eastman Kodak Company, pp. 1-200, 1991-1992.
U.S. Appl. No. 60/019,773, Summ et al., Jun. 14, 1996.
Sirius's Preliminary Invalidity Contentions Under Local Patent Rule 3-3, Civil Action No. 2:07-CV-61 (TJW); 18 pages, Sep. 10, 2007.
Sirius's Preliminary Invalidity Contentions of XMSR Satellite Radio Holdings Inc. and XMSR Satellite Radio Inc., Civil Action No. 2:07-CV-61 (TJW); 58 pages, Sep. 10, 2007.
Sirius Satellite Radio Inc.'s Invalidity Contentions for U.S. Patent No. 7,165,123; Civil Action No. 2:07-CV-61 (TJW); 863 pages, Sep. 10, 2007.
Sirius Satellite Radio Inc.'s Invalidity Contentions for U.S. Patent No. 6,324,592; Civil Action No. 2:07-CV-61 (TJW); 814 pages, Sep. 10, 2007.
Cooper, "*The Development and Application of Intelligent Self Test Concepts in Reconigurable Modular Avionic Systems,*" Institution of Electrical Engineers, pp. 8/1-5, 1995.
NASA Office of Logic Design "*A Scientific Study of the Problems Of Digital Engineering For Space Flight Systems, With A View To Their Practical Solution*", Interfaces and Standards: MIL-STD-1553/1773 Basics, URL:<http://ewhdbks.mugu.navy.mil/1553-bus.htm>, Jan. 24, 2001.
U.S. Department of Defense, "*Military Standard: Aircraft Internal Time Division Command/Response Multiplex Data Bus*, MIL-STD-1553B," Apr. 30, 1975.
Peterson, David, "*Audio, Video and Data Telecommunications*," McGraw-Hill Book Company, Europe, pp. 319-320, 1992.
Senet.com "*Interfacing the Serial / RS232 Port*", v.5.0, obtained from URL:<http://www.senet.com.au/~cpeacock>, Jan. 24, 1998.

Dowling, et al. "*Avionics Maintenance 2010*", IEEE Journal on Selected Areas in Communications vol. SAC-4, No. 6, pp. 1090-1096, Oct. 1986.
Morgan, et al. "*Integrated Modular Avionics for Next-Generation Commercial Airplanes*", IEEE AES Systems Magazine, pp. 9-12, Aug. 1991.
Subramanyam, et al. "*Design for Testability for Future Digital Avionics Systems*", IEEE AES Magazine, p. 2-6, Jun. 1988.
Nessett, "Layering central authentication on existing distributed system terminal services", Security and Privacy, 1989 IEEE Symposium, pp. 290-299, 1989.
Courtrot et al., "A Single Conditional Access System for Satellite-Cable and Terrestrial TV, IEEE Transactions on Consumer Electronics," vol. 35, No. 3, pp. 464-468, Aug. 1989.
Lenoir, Vincent, "Eurocrypt, A Successful Conditional Access System," IEEE, Transactions on Consumer Electronics, vol. 37, No. 3, pp. 432-436, Aug. 1991.
Tsubakiyama, et al. Security for Information Data Broadcasting System with Conditional-Access Control, IEEE, pp. 164-170, 1996.
Takahashi, et al. "THAM 10.5—Supplemental Conditional Access for DSS," IEEE, pp. 1667-167, 1993.
Savage et al. "Pacific Telecommunications Council Fifteenth Annual Conference", Proceedings, vols. I & II, pp. 2-4; v-ix; and 519-524; Briskman "United States Satellite Digital Audio Radio Service", Jan. 17-20, 1993.
Wondra et al. "I$^2$C-Bus Controlled HiFi Audioprocessor" IEEE Transactions on Consumer Electronics, vol. 36, No. 3, Aug. 1990.
Krantz, Donald G. et al., "*The Howitzer Improvement Program: Lessons Learned,*" ACM, 1989.
Compact Disc Change/Compact Disc Changer System: Sony CDX- 65/65RF Service Manual, 53 pages, 1996.
Source Selector: Sony XA-U20/U40 Service Manual, 12 pages, 1991.
FM/AM Cassette Car Stereo; FM/MW/SW Cassette Car Stereo Sony XR-0500 Service Manual, 47 pages, 1996.
From Civil Action No. 2:07-CV-61 Revised Joint Claim Construction and Pre-hearing Statement, 6 pages with Exhibits A-C, Oct. 10, 2008.
From Civil Action No. 2:07-CV-61 Plaintiff Keystone Autonics, Inc.'s Opening Claim Construction Brief, pp. 1-36, with Exhibits 1-13, Oct. 10, 2008.
From Civil Action No. 2:07-CV-61 Defendants' Responsive Claim Construction Brief, with Declaration of Marcus A. Colucci in Support of Defendants' Responsive Claim Construction Brief, pp. i-iv, 1-31, with Exhibits A-JJ, Oct. 31, 2008.
900 MHz Trunked Communications System Functional Requirements Development: The Identification of the Specific Operational Capabilities that should be Incorporated in a Demonstration Trunked Communication, Dept. of Justice, 46 pages, Mar. 1979.
Installation & Operation, EDACS® Site Interface Module (SIM), Ericsson Inc., 34 pages, Jul. 1996.
Mobile Communications: EDACS® S550 Control Unit and Accessories Installation Manual, Ericsson GE Mobile Communications Inc., 32 pages, Nov. 1967.
Installation Manual: S-825 Control Unit & Ranger® Radio Unit Motorcycle Installation, Ericsson, 36 pages, 1994.
Units from Exhibit DX 154 Dissoway: SIR0134321; SIR0134322; SIR0134323; SIR0134324; SIR0134325;

SIR0134326; SIR0134327; SIR0134328; SIR0134329; SIR0134330; SIR0134331; SIR0134332; SIR0134333; SIR0134334; SIR0134335; SIR0134336, 16 pages, Oct. 23, 2008.
Units from Exhibit DX 156 Dissoway: SIR0134344; SIR0134345; SIR134346; SIR134347; SIR134348 and SIR134349, 6 pages, Oct. 23, 2008.
Maintenance Manual Service Section for EDACS FMD™ Mobile Radio Communications, Ericsson, 28 pages, Nov. 1991.
Maintenance Manual Service Section for FMD 16 Plus Mobile Radio Combinations, Ericsson, 34 pages, Oct. 1988.
Operator's Manual, Dual Format MDX, Ericsson GE Mobile Communications Inc., 42 pages, Nov. 1992.
Installation Manual MDX™ Series Mobile Radio, Ericsson GE Mobile Communications Inc., 14 pages, Oct. 1992.
Operator's Manual, EDACS® Orion™ Mobile Radio, Ericsson Inc., 90 pages, Oct. 1998.
Installation Manual Orion™ Mobile Radio, Ericsson Inc., 56 pages, 1993.
PC Programming Software, EDACS®—2 Radios TQ-3373 vol. 1, Ericsson Inc., 265 pages, Oct. 23, 2008.
PC Programming Software, EDACS®—2 Radios TQ-3373 vol. 2, Ericsson Inc., 99 pages, Oct. 23, 2008.
Installation/Maintenance Manual Radio Data Interface, Ericsson Inc., 14 pages.
EDACS® Conventional Network Interface (CNI) GETC Configuration Manual, Ericsson GE Mobile Communications Inc., 30 pages, Oct. 1994.
From Civil Action No. 2:07-CV-61 "Plaintiff Keystone Autonics, Inc.'s Patent Rule 3-1 and 3-2 Disclosures to Defendant Sirius Satellite Radio Inc.", 7 pages, Jul. 25, 2007.
U.S. Patent No. 7,165,123 Claims Chart Sirius Satellite Radio Service using Satellite Ready Systems with List of Sirius Exhibits, 36 pages, Received Dec. 24, 2008.
U.S. Patent No. 6,324,592 Claims Chart Sirius Satellite Radio Service using Sirius Satellite Ready Systems with List of Sirius Exhibits, 46 pages, Received Dec. 24, 2008.
From Civil Action No. 2:07-CV-61 Plaintiff Keystone Autonics, Inc.'s Patent Rule 3-1 and 3-2 Disclosures to Defendants XM Satellite Radio Holdings, Inc. and XM Satellite Radio, Inc., 6 pages, Jul. 25, 2007.
U.S. Patent No. 7,165,123 Claims Chart XM Satellite Radio Service using Satellite Ready Systems with List of XM Exhibits, 36 pages, Received Dec. 24, 2008.
U.S. Patent No. 6,324,592 Claims Chart XM Satellite Radio Service using Sirius Satellite Ready Systems with List of XM Exhibits, 46 pages, Received Dec. 24, 2008.
From Civil Action No. 2:07-CV-61 Plaintiff Keystone Autonics, Inc.'s Preliminary Claim Constructions and Extrinsic Evidence Served Pursuant to P.R. 4-2, 33 pages, Jul. 23, 2008.
From Civil Action No. 2:07-CV-61 "Index, Keystone Autonics, Inc. Extrinsic Evidence Documents Served" 42 pages, Received Dec. 24, 2008.
From Civil Action No. 2:07-CV-61 "Plaintiff Keystone Autonics, Inc.'s Reply to Claim Construction Brief" 19 pages with Exhibits 14-18, Nov. 17, 2008.
Claim Chart re: US Pat. No. 6,324,592—US Pat. No. 5,926,624 ("Katz/Audible Patent") in view of the Katz/Audible Product, 31 pages, Received Dec. 24, 2008.
Claim Chart re: US Pat. No. 7,165,123—US Pat. No. 5,926,624 ("Katz/Audible Patent") in view of the Katz/Audible Product, 33 pages, Received Dec. 24, 2008.

Invalidity of U.S. Patent Nos. 6,324,592 and 7,165,123, Zicker Patent & Related Commercial Product, 25 pages, Received Dec. 24, 2008.
Invalidity of U.S. Patent Nos. 6,324,592 and 7,165,123, Dissoway Patents & Related Commercial Products, 34 pages, Received Dec. 24, 2008.
From Civil Action No. 2:07-CV-61, transcript of video deposition of Marc Dissosway, Merrill Legal Solutions, New York, NY 10036, 270 pages with Errata Sheet, and 41 pages of index, Oct. 23, 2008.
Dallas Semiconductor MAXIM DS2401 Silicon Serial Number, www.maxim-ic.com, 10 pages, Oct. 23, 2008.
From Civil Action No. 2:07-CV-61 (TJW), Nokia Service Manual THA-6, pp. NOK0000001, 3, 6, 15, 17-19, 24, 46, 83, 86, 89, 99-101, 103-106, 108, 109, 112-114, 182, 183, 185-187, 191, 192, 200, 202, 207, 208, 226, 231, 235, 248-250, 255, 258, 259, 261, 267, 276, 282, 285, 289, 291, 292, 299, 316-318, 329-332, 336, 340, 346, 347, 358, 361, 364, 365, 368, 372, 374, 379, 2404, 2409-2411, 2414-2417, 2426, 2441-2445, 2447, 2448, 2450, 2451, 2453-2455, 2461-2475, 2477-2488, 2552, 2554, 2558, 2559, 2561, 2563, 2564, 2615, 2616, 2628, 2641, 2648, 2682, 2684, 2743, 2744, 2761, 2776, 2814, 2820, 2821 (141 pages), 1991.
Sirius Satellite Radio Inc.'s Invalidity Contentions for U.S. Patent No. 6,324,592 Claims Chart pp. 815-821; 837-854 (25 pages).
Sirius Satellite Radio Inc.'s Invalidity Contentions for U.S. Patent No. 6,324,592 Claims Chart pp. 822-836 (15 pages).
Sirius Satellite Radio Inc.'s Invalidity Contentions for U.S. Patent No. 7,165,123 Claims Chart pp. 864-895 (32 pages).
Sirius Satellite Radio Inc.'s Invalidity Contentions for U.S. Patent No. 7,165,123 Claims Chart pp. 896-915 (20 pages).
Lenoir, Vincent, "Eurocrypt, A Successful Conditional Access System," CCETT, Cesson-Sevigne (France), IEEE Transactions on Consumer Electronics, vol. 37, No. 3, 5 pages, Jun. 7, 1991.
Sirius' Supplemental Preliminary Invalidity Contentions under Local Patent Rule 3-1(h) (10 pages).
Sirius' Supplemental Preliminary Invalidity Contentions under Local Patent Rule 3-1(h), attachment (1): U.S. Patent No. 6,324,592 Claim Chart (Supplemental Invalidity Contentions)—Patents (2 pages).
Sirius' Supplemental Preliminary Invalidity Contentions under Local Patent Rule 3-1(h), attachment (2): U.S. Patent No. 7,165,123 Claim Chart (Supplemental Invalidity Contentions)—Patents (2 pages).
Sirius' Supplemental Preliminary Invalidity Contentions under Local Patent Rule 3-1(h), attachment (3): Sirius Satellite Radio Inc.'s Second Supplemental Invalidity Contentions for U.S. Patent No. 6,324,592 (86 pages).
Sirius' Supplemental Preliminary Invalidity Contentions under Local Patent Rule 3-1(h), attachment (4): Sirius Satellite Radio Inc.'s Supplemental Invalidity Contentions for U.S. Patent No. 7,165,123 (122 pages).
Sirius' Supplemental Preliminary Invalidity Contentions under Local Patent Rule 3-1(h): Exhibits A-II (678 pages).
Sirius' Third Supplemental Preliminary Invalidity Contentions under Local Patent Rule 3-1(h) (pp. 1-5 and 7; 6 pages total).
Sirius' Third Supplemental Preliminary Invalidity Contentions under Local Patent Rule 3-1(h), attachment (1): Sirius Satellite Radio Inc.'s Third Supplemental Invalidity Contentions for U.S. Patent No. 7,165,123 (16 pages).

Sirius' Third Supplemental Preliminary Invalidity Contentions under Local Patent Rule 3-1(h), attachment (2): Sirius Satellite Radio Inc.'s Third Supplemental Invalidity Contentions for U.S. Patent No. 6,324,592 (11 pages).

Sirius' Third Supplemental Preliminary Invalidity Contentions under Local Patent Rule 3-1(h), attachment (3): U.S. Patent No. 7,165,123 Claim Chart (Third Supplemental Invalidity Contentions)—Patents (1 page).

Sirius' Third Supplemental Preliminary Invalidity Contentions under Local Patent Rule 3-1(h), attachment (4): U.S. Patent No. 6,324,592 Claim Chart (Third Supplemental Invalidity Contentions)—Patents (1 page).

From Civil Action No. 2:07-CV-00061-TJW "Memorandum Opinion and Order.", 21 pages, Jan. 16, 2009.

* cited by examiner

SECTION A-A

SECTION B-B

MOBILE UNIT ATTACHED IN A MOBILE ENVIRONMENT THAT FULLY RESTRICTS ACCESS TO DATA RECEIVED VIA WIRELESS SIGNAL TO A SEPARATE COMPUTER IN THE MOBILE ENVIRONMENT

CROSS-REFERENCE TO RELATED APPLICATION

This application is a continuation of, and claims a benefit of priority under 35 U.S.C. 120 of the filing date of U.S. patent Application Ser. No. 09/956,182 by inventor George William Hindman entitled "Apparatus and Method for I/O Management in a Mobile Environment" filed on Sep. 19, 2001 now U.S. Pat. No. 7,165,123, which in turn claims the benefit of priority under 35 U.S.C. § 120 of the filing date of U.S. patent Application Ser. No. 09/028,590, which issued as U.S. Pat. No. 6,324,592, by inventor George William Hindman entitled "Apparatus and Method for a Mobile Computer Architecture and Input/Output Management System" filed Feb. 24, 1998, which in turn claims the benefit of priority under 35 U.S.C. § 119 to U.S. Provisional Patent App. No. 60/038,078 filed Feb. 25, 1997, the entire contents of which are hereby expressly incorporated by reference for all purposes.

BACKGROUND OF INVENTION

1. Field of Invention

The present invention introduces a new, flexible mobile computer architecture and therefore relates to several different fields. These fields include navigation, communications (including radio navigation), electrical computers, computer architectures, Input/Output (I/O) management, data processing systems, data storage and retrieval, land vehicles, motor vehicles, and radio frequency reception and use.

2. Description of the Related Art

Current mobile computer architectures have fixed configurations which limit their capabilities. These computer systems are designed to interface with predetermined input/out devices and offer little flexibility for easy field installation and removal. Examples of equipment used in fixed configurations include hardwired 900 MHz radio receivers and transmitters and navigation aids such as geomagnetic sensors, angular rate sensors, odometer connections and radio navigation interfaces.

It is usually desired in field operations to use hardware components designated as line replacement units (LRUs). These LRUs promote flexibility and possess easy reconfiguration capabilities in mobile vehicle environments. LRUs accomplish these features by having standardized Input Output (I/O) interfaces. The present invention provides for a unique mobile computer architecture facilitating the use of LRUs.

Input/Output (I/O) devices are currently connected to computing platforms in numerous ways. One method of coupling I/O devices to a computer system is to allow the computer system, which is processing software, to direct input/output instructions over a bus to read/write registers located on the input/output device. Examples of this are the Industry Standard Architecture (ISA) bus, the Extended Industry Standard Architecture (EISA) bus, and the Peripheral Component Interconnect (PCI) bus. Another method couples a computer system with I/O devices by not directly sending input/output instructions to registers on the I/O device. Examples of such a set-up are the VME Extensions for Instrumentation (VXI) bus and the General Purpose Interface Bus (GPIB). The present invention is a configurable architecture allowing for direct and indirect means of I/O management as well as the use of I/O discrete lines. Such an I/O management system does not exist in the prior art and would be beneficial for mobile user operations.

Additionally, current mobile computer systems do not provide line replaceable units for purposes such as navigation and telecommunications. These existing systems also do not possess standard radio features such as a stereo Amplitude Modulation (AM)/Frequency Modulation (FM) and Compact Disk Read Only Memory (CDROM) audio capabilities. Examples of these limited mobile platforms are units which provide only navigation aid, or only navigation and guidance aid, or only mobile communications. The present invention provides these features as well as additional ones not found in any current apparatus. An example is that no current unit provides for the additional use of a microprocessor to augment the application capabilities available to the mobile user. These capabilities include, but are not limited to, data acquisition, data analysis, non-navigation data storage and retrieval, and basic data base access. The present invention provides for the additional use of a microprocessor to augment the capabilities available to the mobile user.

The physical appearance of the present invention is designed to allow for the easy replacement of the unit's faceplate. By incorporating a standardized user interface, customized faceplate designs can be readily installed. Additionally, current theft protection measures for mobile computing platforms usually rely on non-configurable emergency notification schemes; theft deterrence features for systems are limited. The present invention provides innovative theft protection features so that the unit is not easily used if stolen. The computer system architecture also allows for theft protection of deployed hand held user interfaces. User safety is also promoted by the hand unit storage capability for when the vehicle is in motion.

An additional safety consideration involves emergency accident notification. The prior art involving this capability involves the use of acceleration data to determine if the vehicle has been involved in an accident. When an accident is detected, by means of sudden deceleration, a radio transmission is sent to provide for emergency services. The current methods used to provide this crash detection notification rely on the use of physical and electrical connections to existing air bag sensors in vehicles. The present invention employs a different approach, incorporating the mobile computer's architecture and I/O management system with a emergency crash services LRU I/O device optimized for detecting and verifying accident related decelerations.

Another feature of the present invention involves navigation data presented to the mobile user. The existing prior art concerning the combination of navigation and computing capabilities can be broken into several major categories. The first grouping is of systems which provide direct microprocessor control of non-removable navigation and guidance components. These systems are sometimes comprised of radio navigation units, such as those used to receive U.S. Global Positioning System (GPS) or Russian GLONASS radio signals. Other approaches have an apparatus hardwired to receive orientation and velocity data from outside sensors, such as geomagnetic references, angular rate sensors, vehicle odometer connections, and/or inertial measurement systems.

A second approach taken in the existing art is to match data from stored precision map databases with data acquired from any of the above mentioned sensors. These approaches try to determine and present the vehicle's position as what is the "most probable" position on an existing road map. A third approach uses multiple antennae and receivers to eliminate possible errors. Still yet another approach is to use differential radio corrections transmitted to the vehicle navigation system within a certain geographical region. In addition to the selected method, all attempt to use some form of Kalman filtering to further improve the calculated location.

The above mentioned approaches employ systems and methods which are costly, require large amounts of physical space and electrical power, and require custom vehicle installation. To reduce cost and complexity and to provide a system that can physically fit in restricted spaces, a configuration must be established which attempts to reduce outside sensors and radio reception. Therefore, the present invention provides an improved system and method for location determination that enables a navigation LRU I/O device to receive radio navigation signals without using any additional outside mechanical sensors. This is accomplished by incorporating the mobile computer's architecture and I/O management system with an onboard sequence of statistical estimation calculations to improve location determination.

Lastly, the few existing mobile computer systems are usually housed in several enclosures and require custom installation in vehicles. The present invention provides for a unique computer architecture combining radio, CDROM, and microprocessor capabilities with a flexible I/O management system that is encased in a single modular unit. This promotes quick and easy installation in any vehicle.

SUMMARY OF THE INVENTION

The present invention embodies an apparatus, system, and method for combining a flexible input/output management system with a new mobile computer architecture. The disclosed mobile computer architecture possesses a microprocessor and standard radio features including stereo Amplitude Modulation (AM)/Frequency Modulation (FM) and Compact Disk Read Only Memory (CDROM) audio capabilities. The present invention further provides a specifically designed and optimized I/O management system for line replacement units (LRUs). This I/O management system allows for modular expansion and system upgrades.

The LRU devices cover user desired functions such as, but not limited to, navigation, crash detection, and telecommunications. Embodiments of such LRUs include a unique navigation I/O device with new statistical estimation capabilities and a crash detection I/O device with onboard deceleration calculation and verification features. The present invention is also encased in one modular unit. Additionally, theft deterrence features have been incorporated into the present invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Mobile Computer Architecture

Figure 1:
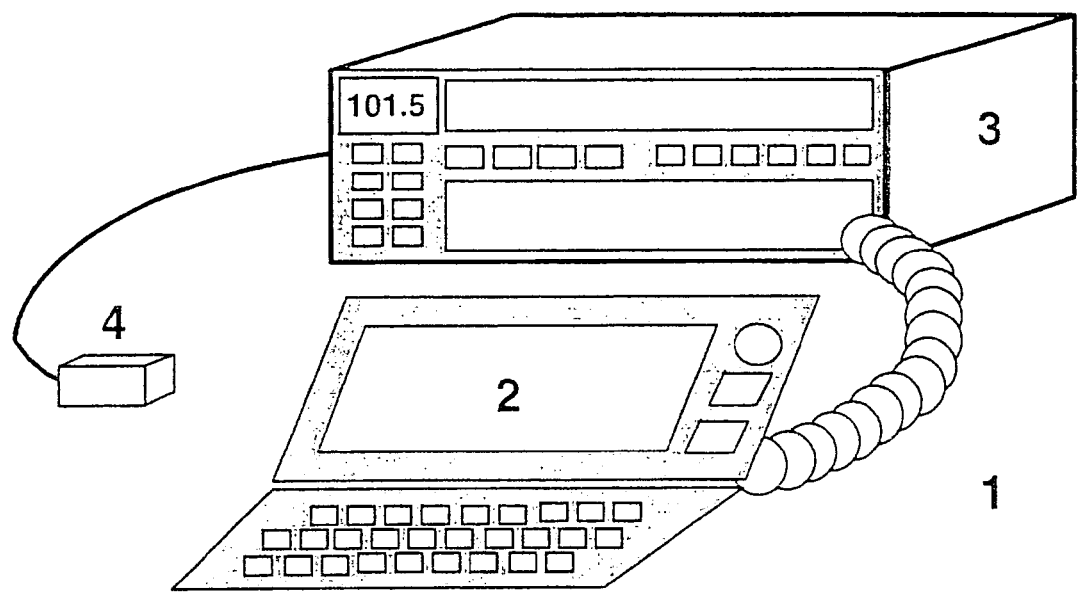
FIG. 1 illustrates the apparatus' appearance according to the present invention.

Referring now to FIG. 1, an illustration of the apparatus' appearance, the preferred embodiment of the present invention 1 is depicted as a single self contained unit which allows for easy installation into any existing or future land or motor vehicle. The hand held user interface unit 2 is stored in the main assembly 3. The navigation antenna 4 is shown coming from the rear of the main assembly 3, where other antennas, bus connections, I/O discretes, power connections, and auxiliary outlets originate.

Figure 2:
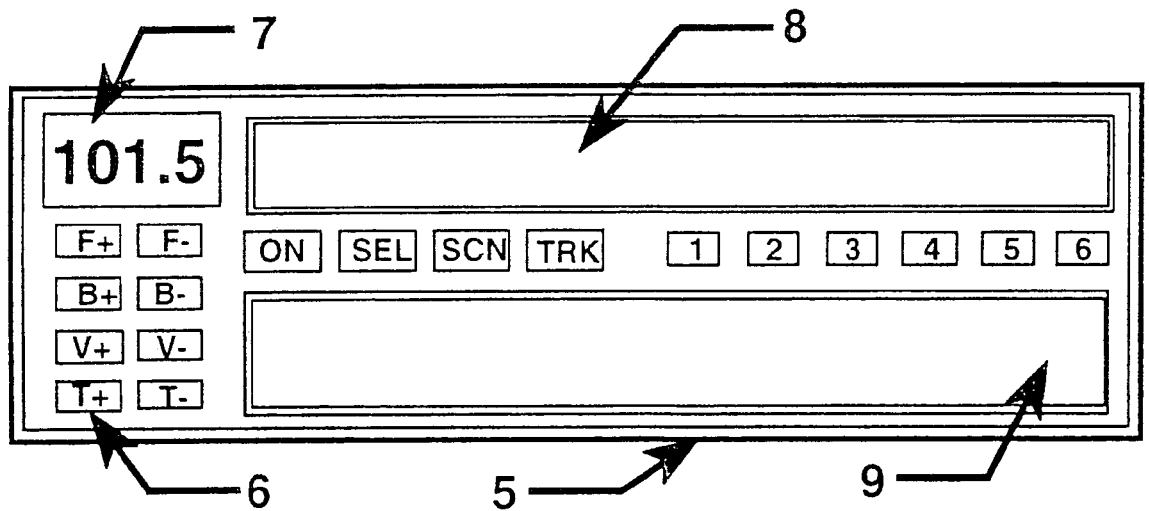
FIG. 2 illustrates the faceplate of the apparatus' main assembly.

Referring now to FIG. 2, an illustration of the faceplate of the apparatus' main assembly, the present invention's 1 main assembly faceplate 5 is shown with several component features. Function selection controls 6 are located on the faceplate to facilitate user interface with the present invention's AM/FM stereo radio and CD-ROM player. Function selection controls 6 are also available for other additional uses. Basic radio and CD-ROM output information is presented to the user via the Liquid Crystal Display (LCD) 7. Access to the CD-ROM is achieved through the CD-ROM tray access 8 and access to the hand held user interface unit 2 is available via the user interface storage slot 9.

Figure 3:
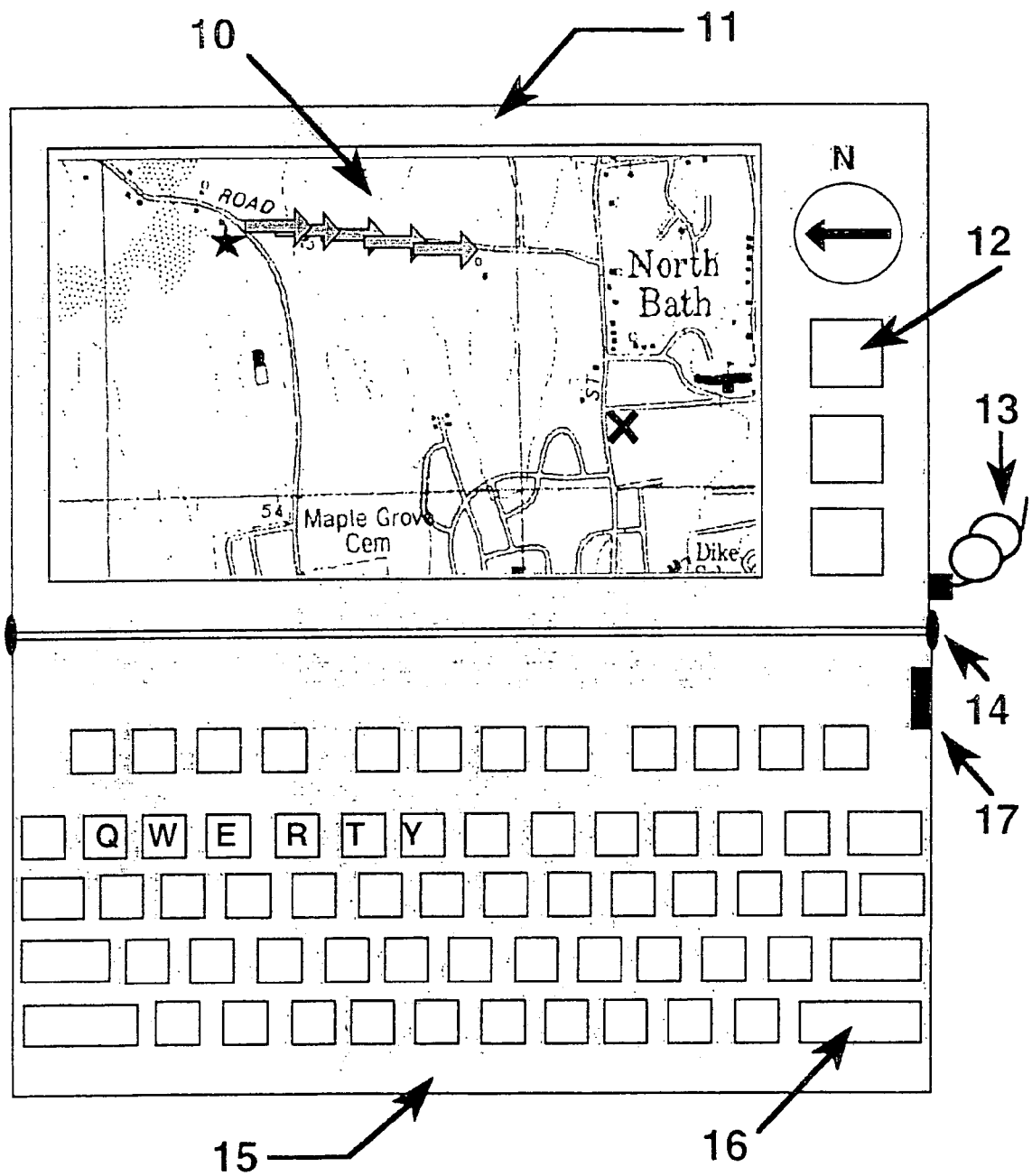
FIG. 3 illustrates the apparatus' hand held user interface.

Referring now to FIG. 3, an illustration of the apparatus' hand held user interface, the hand held user interface unit 2 is shown in an open position. The hand held interface unit upper casing 11 and the hand held interface unit lower casing 15 can be closed together by motion about the swivel mount 14. By securing the hand held interface unit 2 in a closed position, it is possible to then store the unit in the user interface storage slot 9 within the main assembly 3. Interface unit user selection controls 12, located on the unit casing, allow the mobile user to communicate with the computer system located within the main assembly 3. Information output from the computer system is displayed on the hand unit's display screen 10, which could be, but is not limited to, a touch sensitive LCD or active matrix thin film transistor (TFF) display.

Referring again to FIG. 3, the hand held user interface unit 2 has additional user input capabilities from either a keyboard entry system 16 or a voice command microphone system 17. The keyboard input can include, but is not limited to, standard alphanumeric keys found on a QWERTY style computer keyboard, function keys, HEX numeric keys, and mouse cursor and data entry techniques. The voice input can provide, but is not limited to, a microphone and the associated equipment needed for speech recognition. Data exchange between the hand held unit 2 and the mobile computer system housed within the main assembly 3, as well as the power supply, is provided through the power and data chord 13. Data exchange is not limited to this method as alternative embodiments could employ other means such as an Infra Red data port. Similarly, power could be provided by rechargeable or non-rechargeable battery systems.

Figure 4:
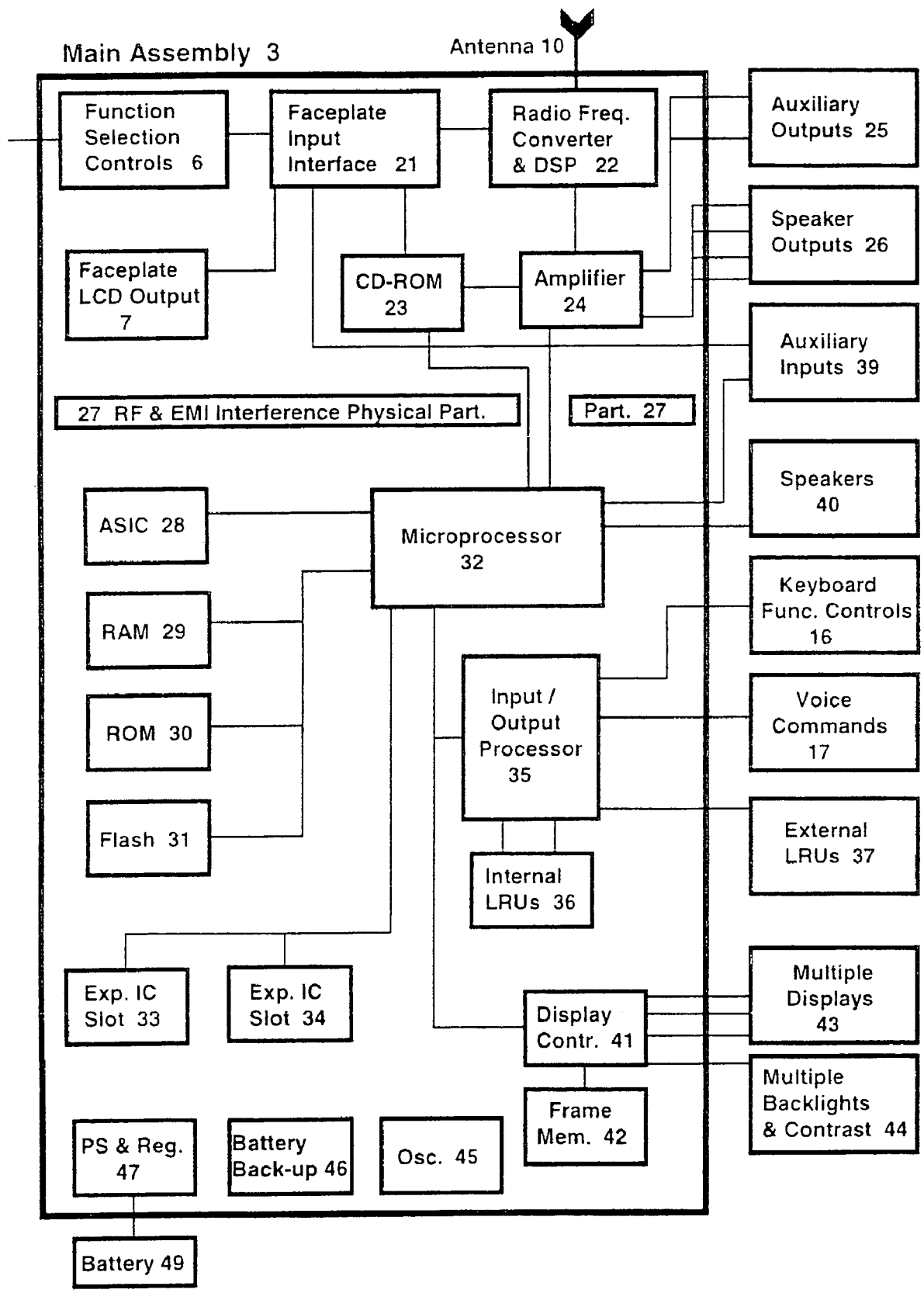
FIG. 4 is a block diagram illustrating the mobile computer architecture system.

Referring now to FIG. 4, a block diagram illustrating the mobile computer architecture of the present invention, it can be seen that the mobile computer architecture is enclosed within the main assembly 3. The mobile user is able to access the function selection controls 6, located on the main assembly faceplate 5, to input data to the radio and CD-ROM components of the mobile architecture. This input is read by the faceplate input interface 21, and distributed to the appropriate system component over the faceplate data bus network 48. Data output to the user is sent from the faceplate interface 21 over the bus network 48 to the faceplate LCD 7.

Referring again to FIG. 4, the AM/FM stereo radio component of the architecture receives its radio frequency (RF) signals from the radio antenna 20. These signals are sent to the RF filter and down converter digital signal processor (DSP) 22 which processes the radio signals so that conditioned signals can be sent to the amplifier 24. The amplifier 24 then sends the strengthened signals to auxiliary outputs 25 and multiple speaker outputs 26. The CD-ROM system component 23 is accessed through the faceplate input interface 21 by using the proper function selection controls 6. When an audio CD-ROM is placed in the CD-ROM system, the music output is sent from the CD-ROM 23 to the amplifier for signal boosting and eventual output to the speakers 26 or the auxiliary components 25. A physical RF and electromagnetic interference (EMI) partition 27 separates the various components within the mobile computer architecture. This is done to ensure system integrity and the partitions may take various forms and be comprised of various materials.

Referring again to FIG. 4, the computer system associated with this mobile architecture centers around the microprocessor 32, which performs all standard central processing unit (CPU) functions and is interfaced with other components through the address and data bus network 38. This network 38 is composed of a combination of address, control, and data busses and/or individual Input/Output (I/O) discrete lines. The Read Only Memory (ROM) 30 may contain coded instructions which may be fixed in medium by a variety of means such as, but not limited to, programmable ROM (PROM, EPROM, EEPROM) or any form of programmable logic device (PLD). The Application Specific Integrated Circuit (ASIC) 28 also may be designed for useful, specific mobile user applications. These two components together, or in separate modes, will provide the mobile user with an operating system by which the user can operate the computer apparatus. The operating system may have several levels of complexity and be proprietary in nature or of a commercial standard such as, but not limited to, a basic input output system (BIOS), disk operating system (DOS), Microsoft Windows 3.1, Windows 95, Windows CE, or QNX.

Again referring to FIG. 4, the Random Access Memory (RAM) module 29 may be composed of dynamic RAM (DRAM) or static RAM (SRAM). The Flash Memory 31 should be composed of a non-volatile memory component. Both the RAM 29 and the Flash 31 are designed to accommodate temporary and long term data storage needs and are designed for future expansion and/or upgrades. The microprocessor 32 also connects to the CD-ROM system component 23 so that data from a user supplied data CD-ROM can be read by the mobile computer architecture. The data may be continually accessed from the CD-ROM or loaded into system memory for later use and/or execution. The microprocessor 32 also connects to the amplifier 24 such that any desired microprocessor signal can be output to the speakers 26 or any auxiliary systems 25. A direct speaker interface 40 also is connected to the microprocessor 32. Additionally, auxiliary inputs 39 are interfaced to the microprocessor 32 and the faceplate input interface 21. These inputs allow for data input such as, but not limited to, external CD-ROM signals and vehicle diagnostic capabilities such as engine controller and environment control connections.

Referring again to FIG. 4, the microprocessor 32 can interface with expansion slots 33 and 34 which allow for additional integrated circuits or future upgrades. Additionally, the present invention has the microprocessor 32 connected to a display controller 41 which in turn connects to multiple user displays and multiple backlight and contrast controls 44. The display controller 41 is also interfaced with a buffer memory module 42. The mobile computer architecture microprocessor 32 is most importantly interfaced with an Input/Output (I/O) Processor 35 uniquely optimized for mobile user line. replaceable unit (LRU) applications. The I/O processor 35 interfaces with internal LRUs 36 and external LRUs 37 as well as connecting to non-main assembly input components such as keyboards 16 and voice recognition commands 17. The I/O processor 35 and related bus structure is outlined in greater detail below.

Referring to FIG. 4 again, other necessary system components of the mobile architecture are depicted, such as power supplies and regulators 47, a battery backup 46, and oscillators 45. Power supplies could consist of various potential sources such as a 12V DC automobile battery 49 or automobile alternator source; voltage regulation could be stepped down to various levels including, but not limited to, 5V or 3.3V. A battery backup 46 could consist of an internally stored dry cell battery or a "keep alive" wire lead to an automobile battery. Oscillators 45 could take various forms including that of the temperature controlled crystal oscillator (TCXO). Finally, it is contemplated that the mobile computer architecture described herein may in fact have various forms, such as being a single chip or chipset, or being incorporated onto a larger chip or board as one of multiple functions on the chip or board.

I/O Management System and Line Replaceable Units

It is usually desired in field operations to have a user friendly I/O management structure which allows the use of line replaceable units (LRUs). The LRU architecture described herein promotes flexibility and possesses easy reconfiguration capabilities while in a mobile vehicle environment. The preferred embodiment provides a data bus and I/O discrete line network (address, control, and data connections) which connect the I/O processor with an LRU. This network may contain a plurality of means such as, but not limited to, parallel and serial ports, ISA, EISA, PCI, and/or VME busses, PCMCIA card slots, or other types of standard busses or specially designed proprietary bus structures. Additional features of this optimized I/O management system are improved safety standards and theft deterrence.

Figure 5:
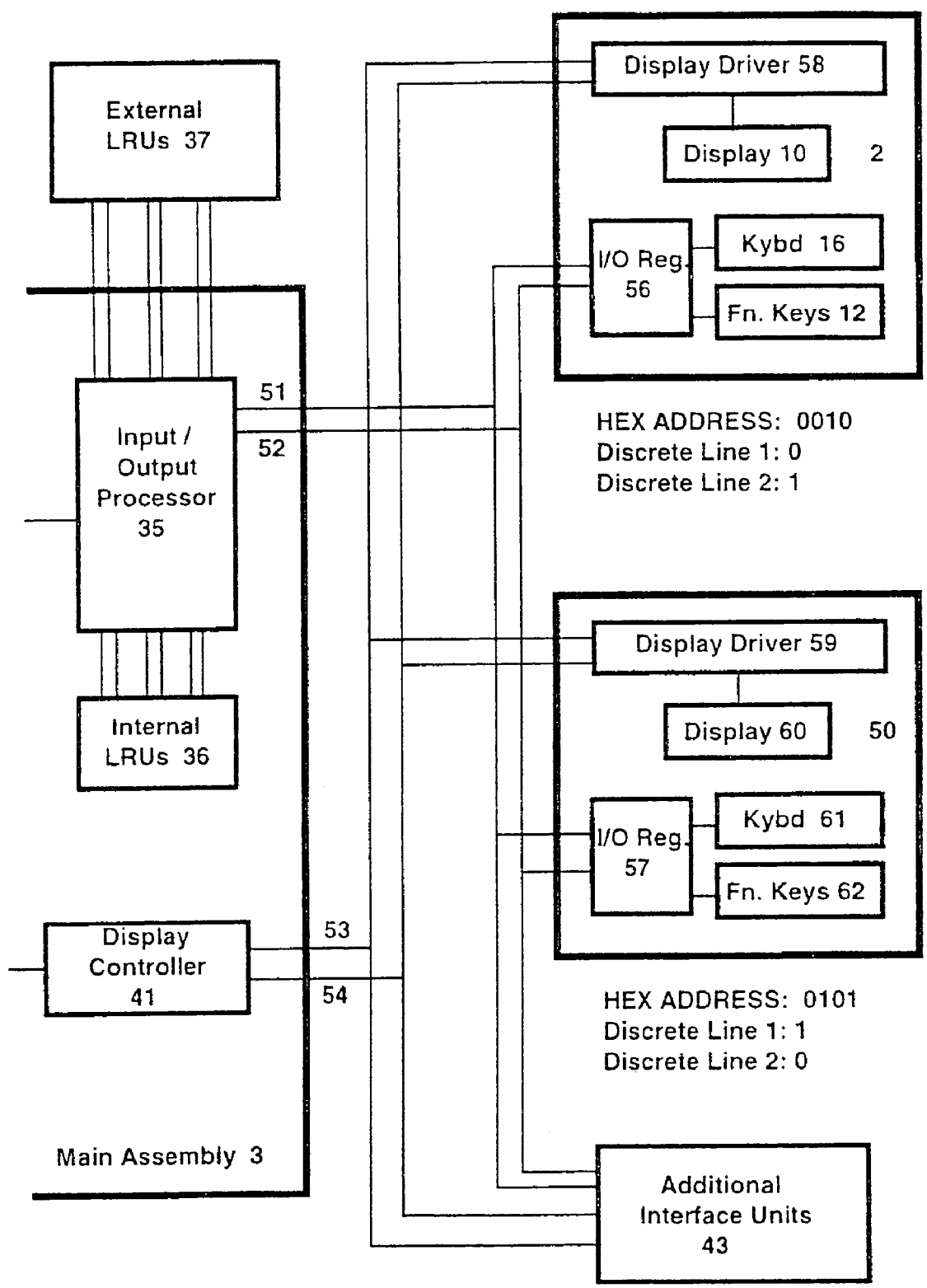
FIG. 5 is a block diagram illustrating the I/O management of the main assembly with the user interface units and with the line replacement units (LRUs)

Referring now to FIG. 5, a block diagram of the external I/O management system, the main assembly 3 is shown in partial representation with the I/O processor 35 and the display controller 41. The I/O data bus 51 is shown interfacing, among other components, the I/O processor 35 with internal LRUs 36 and external LRUs 37. The I/O data bus 51 is a combination of an address, control, and data bus structure consisting of, but not limited to, an eight (8), sixteen (16), thirty-two (32), or sixty-four (64) bit architecture. In possible conjunction with this bus structure is a complementing network of I/O discrete lines 52, which may cycle between, but is not necessarily limited to, ±5V or ±3.3V. The I/O data bus 51 and I/O discrete lines 52 also connect the I/O processor 35 with the first hand held user interface unit 2 as well as other hand held units 50 or additional user interfaces 43.

The display controller 41 also interfaces with the hand held units 2 and 50 as well as additional user interfaces 43 using the Display data bus 53 and the Display I/O discrete lines 54. The Display data bus 53 is a combination of an address, control, and data bus structure consisting of, but not limited to, an eight (8), sixteen (16), thirty-two (32), or sixty-four (64) bit architecture. In possible conjunction with this bus structure, the network is complemented with the Display discrete lines 54, which may cycle between, but not necessarily only, ±5V or ±3.3V. The Display data bus 53 and Display discrete lines 54 connect the Display controller 41 to the appropriate display drivers in the first 58 and second 59 hand held units. The display drivers 58 and 59 provide means, but are not limited to, generating characters, displaying layered text, and presenting graphics on the hand held unit displays 10 and 60. The I/O data bus 51 and I/O discrete line 52 connects the I/O processor 35 with the appropriate I/O registers in the first 56 and second 57 hand units. Hand held keyboard units 16 and 61, as well as hand held unit function keys 12 and 62, interface with the appropriate hand held unit I/O registers 56 and 57.

Again referring to FIG. 5, an example is shown to demonstrate the uniqueness of this LRU I/O management system. Appearing to the right of the depictions of hand held units 2 and 50, there appears a combination of addresses, represented as a HEX word and two discrete lines. In order to promote accurate data dissemination and collection, each hand held interface unit has a unique address from which to communicate with the mobile computer architecture. If the proper address signature is not provided to the mobile computer system in the main assembly 3, data access can be restricted. This can be done via user selected passwords or by hardware unit code and pin configuration. This feature promotes safety and data security for the system as well as providing substantial theft deterrence since the entire system can only be accessed by authorized users. This I/O management network also allows for quick field replacement of secured and authorized LRUs. In final consideration, it is also contemplated that the I/O management system described herein may in fact have various forms and embodiments, such as being a single chip or chipset, or being incorporated onto a larger chip or board as one of multiple functions on the chip or board.

Additional Anti-Theft and Appearance Features

An alternative embodiment of the main assembly faceplate 5 involves an easily replaced front panel which can slide into place over the front of the main assembly 3. The replaceable faceplate would be standardized and the composition material flexible enough such that the faceplate could be physically touched to depress and activate an underlying function selection control. This feature provides for additional anti-theft deterrence and possible upgrade of the present invention's 1 appearance. To deter the system from being stolen, a blank boilerplate panel could be placed over the system to make it appear to outside onlookers that no mobile computer architecture exists in the vehicle. Custom designed replaceable faceplates could provide options on visually appealing user interface designs.

Figure 6A:
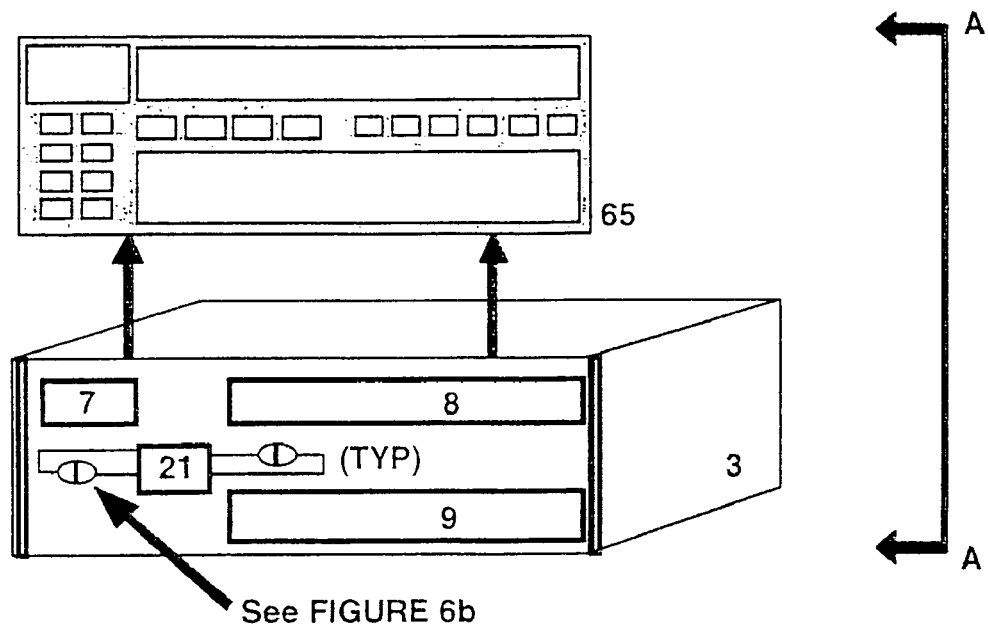
FIG. 6 illustrates additional anti-theft and safety features of a faceplate design alternative of the apparatus' main assembly.
Figure 6A:
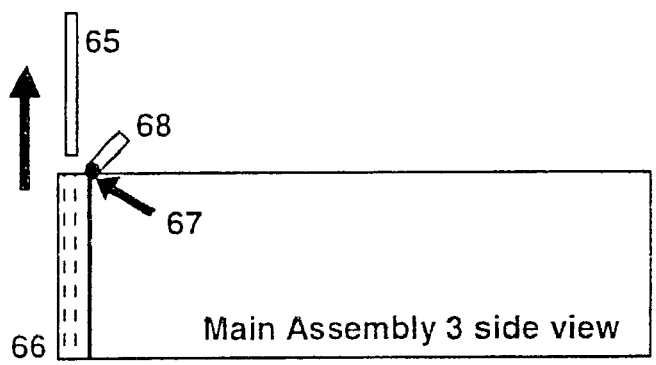
Figure 6B:
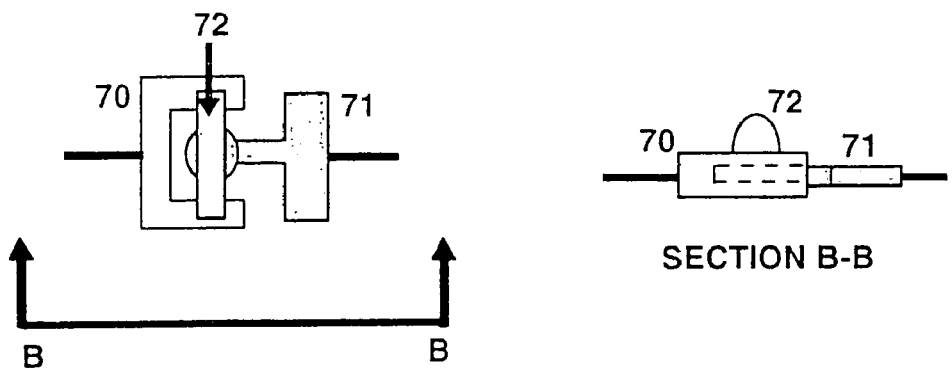

Referring now to FIG. 6a, an illustration of additional faceplate anti-theft and design features, an exploded view of the main assembly 3 is depicted with the replaceable faceplate 65 located above the front of the assembly. The replaceable faceplate 65 would fit down into the front panel retainer 66. At the top of the retainer is attached a hinge 67 which is also attached to the front panel retainer cover 68. The front panel retainer cover is closed down over the replaceable faceplate 65, once it has been slid into the front panel retainer 66. FIG. 6b shows a possible configuration for the function selection control 6 components. Switch component A 70 is situated next to and almost interlocks with switch component B 71. Switch component C 72 is crafted such that upon being depressed, it makes contact with both switch components A 70 and B 71. This allows an electric current to flow through the switch, thus activating the control. The replaceable faceplate 65 is pliant enough so that when it is secured in the front panel retainer 66, finger pressure upon its surface is sufficient to depress the underlying switch component C 72. It is also contemplated that these additional features may in fact have various forms, such as being on a single chip or chipset, or being incorporated onto a larger chip or board as one of multiple functions on the chip or board.

Independent Radio Navigation LRU I/O Device

Figure 7:
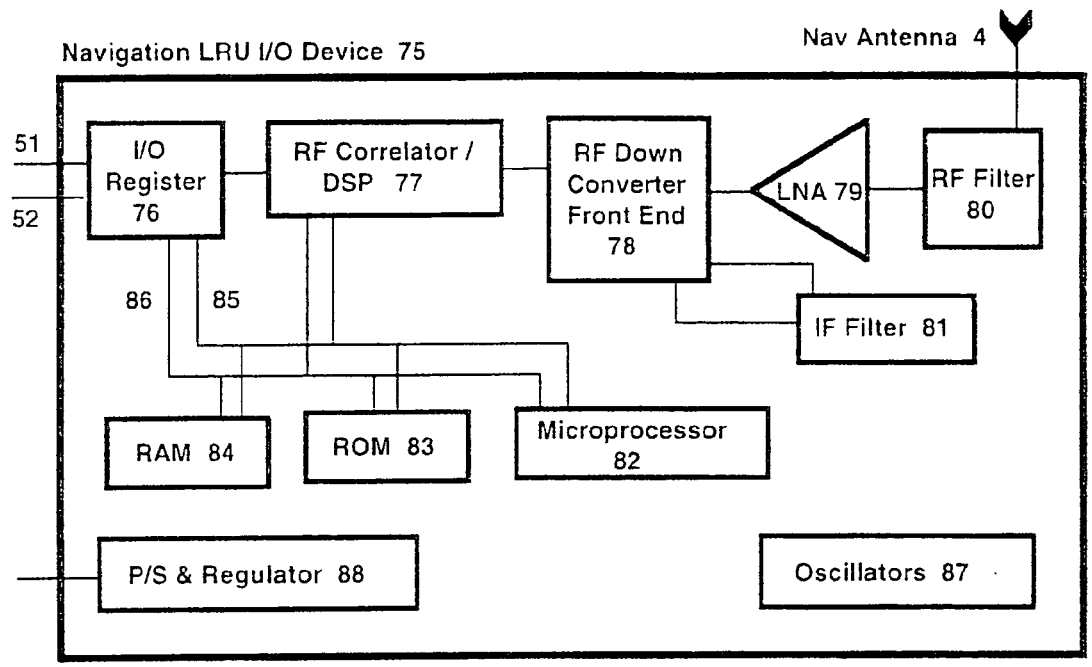
FIG. 7 is a block diagram illustrating a navigation LRU I/O device.

The preferred embodiment allows for the flexibility to add and configure the line replaceable units as required for the mobile user's needs. An additional feature of the present invention is a radio navigation LRU I/O device specifically designed to fully utilize the optimized I/O management of the mobile computer architecture. FIG. 7 illustrates a preferred embodiment for this LRU.

Satellite radio navigation signals can be used to compute a receiver's position anywhere on the Earth. Examples of such satellite radio navigation systems are the United States' Global Positioning System (GPS) and the Russian GLONASS navigation system. The determination of location based on radio navigation signals is well known in the art, therefore only a brief overview is outlined herein. The Cartesian (x,y,z) coordinates of the satellites are determined by interpreting the ephemeris data provided by the satellites. Pseudoranges between the receiver and the satellites are than calculated based on transmission time delays. Given information from four satellites, the location of the receiver can be determined from the four distance equations:

$$(X_1-U_x)^2+(Y_1-U_y)^2+(Z_1-U_z)^2=(R_1-C_b)^2$$

$$(X_2-U_x)^2+(Y_2-U_y)^2+(Z_2-U_z)^2=(R_2-C_b)^2$$

$$(X_3-U_x)^2+(Y_3-U_y)^2+(Z_3-U_z)^2=(R_3-C_b)^2$$

$$(X_4-U_x)^2+(Y_4-U_y)^2+(Z_4-U_z)^2=(R_4-C_b)^2$$

where $X_{1-4}$, $Y_{1-4}$, and $Z_{1-4}$, are the X, Y, and Z coordinates of the four satellites, $U_{x,y,z}$ is the position of the user's receiver, and $C_b$ is the clock bias error. There are four equations and four unknowns in this outlined system; therefore the equations can be solved for the clock bias and the position of the receiver. The preferred embodiment of the present invention couples this basic approach with statistical analysis techniques and the I/O management method outlined previously to produce a unique system which enhances the user's calculated location.

Referring now to FIG. 7, an illustration of an independent radio navigation LRU I/O device, it can be seen that the whole line replaceable unit is defined as component 75. A data bus 51, defined previously in FIG. 4, provides data to and from the I/O processor 35 and the navigation I/O register 76. Additionally, discrete lines 52, also defined previously in FIG. 4, relay discrete information between the I/O processor 35 and the navigation I/O register 76. The navigation I/O register 76 can forward data to the Radio Frequency (RF) Correlator/Digital Signal Processor (DSP) 77 and/or the navigation microprocessor 82. This information transfer occurs over the navigation data bus 86 and is coordinated through the use of a navigation address bus 85.

The preferred embodiment of the navigation LRU 75 is to receive radio navigation signals and then determine the receiver's position. This is done by receiving signals through the navigation antenna 4 and directing these signals to a radio frequency (RF) filter 80. The filtered signal is then passed to a low noise amplifier (LNA) 79 to boost signal strength and then forwarded to the RF front end down converter 78. Subsequent image filtering occurs in the IF filter(s) 81 to protect against out-of-band interfering signals. The signal is then passed from the RF down converter 78 to the RF correlator/DSP 77 for digital signal processing. This process includes, but is not limited to, acquisition and tracking of multiple channels of spread spectrum signals. Automatic Gain Control (AGC) functions may also be relayed between the RF DSP 77 and the RF down converter 78.

The navigation microprocessor 82 performs standard central processing unit (CPU) functions and is interfaced to memory through the navigation address bus 85 and data bus 86. The Random Access Memory (RAM) modules 84 may be composed of dynamic RAM (DRAM) or static RAM (SRAM). The Read Only Memory (ROM) 83 may contain coded instructions which may be fixed in medium by a variety of means such as, but not limited to, programmable ROMs (PROM, EPROM, EEPROM), application specific integrated circuits (ASICs), or programmable logic devices (PLDs). Also found within the navigation LRU 75 are other necessary system components such as power supplies and regulators 88 and oscillators 87. Power supplies could consist of various potential sources such as 12V DC and voltage regulation could be stepped down to various levels including, but not limited to, 5V or 3.3V. Oscillators could take various forms including one of the most popular, the temperature controlled crystal oscillator (TCXO).

Figure 8:
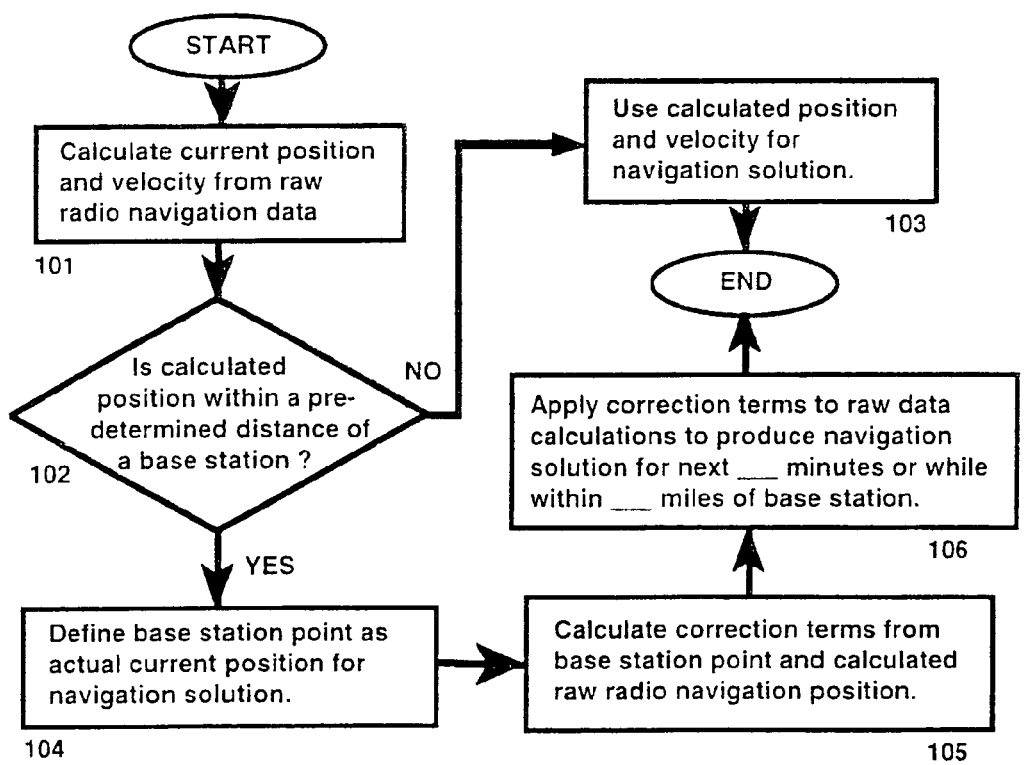
FIG. 8 is a flow chart of steps used for determining error correction terms for a navigation location solution.
Figure 9:
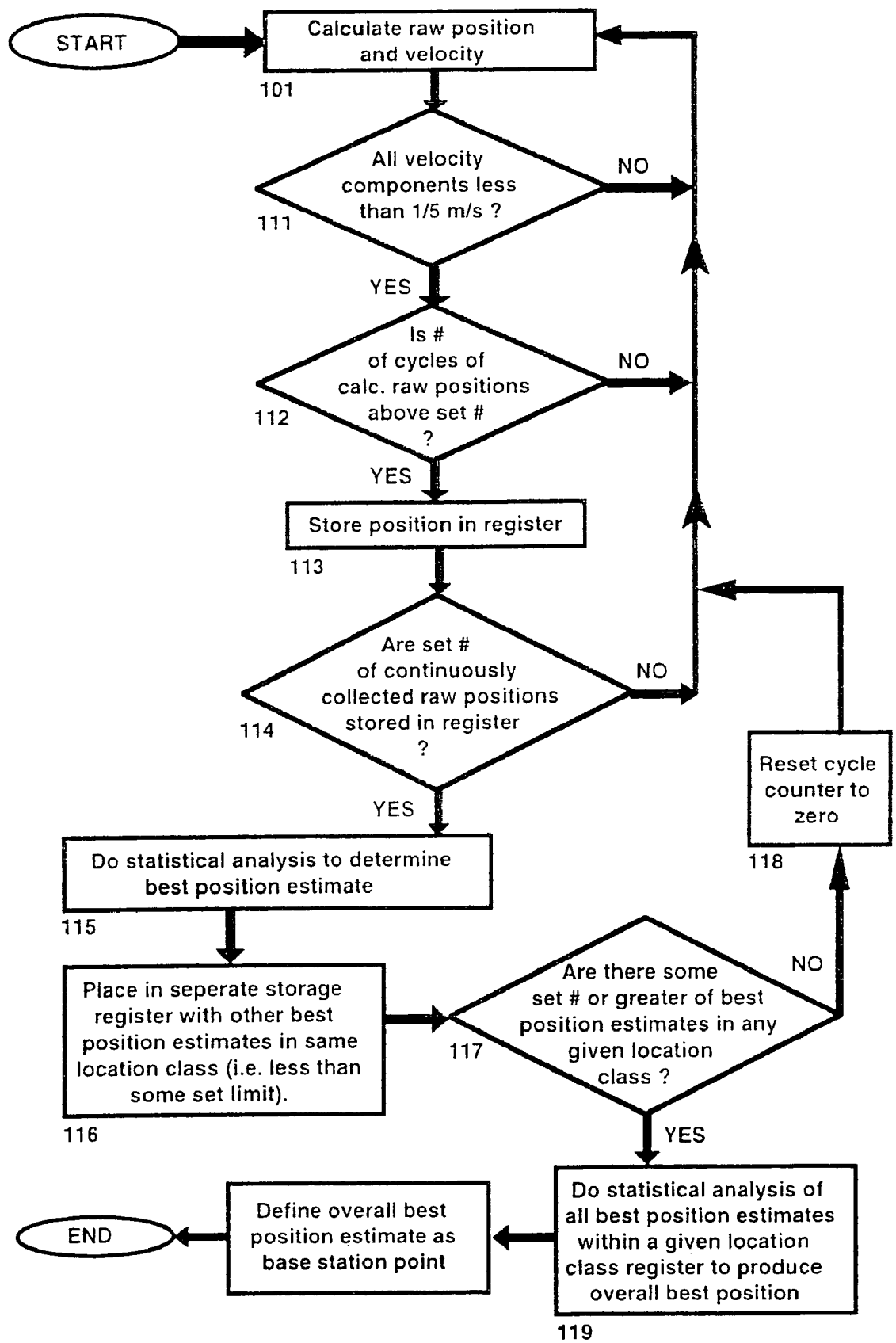
FIG. 9 is a flow chart of steps used for determination of base station points.

Encoded in the ROM 83 of the preferred embodiment navigation LRU I/O device 75, will be various methods to statistically optimize the position calculated from the radio navigation signals. Numerous means can be used to filter out signal noise and potential error sources. Examples include, but are not limited to, batch filters and recursive sequential filters of which Kalman filtering is one technique. A method to reduce positional uncertainty involves the incorporation of correction terms to counter possible error sources such as selective availability or atmospheric propagation delays. If a known survey location is compared to a receiver's collocated calculated position, correction terms can be determined to match the true known location with the calculated position. FIGS. 8 and 9 are flow chart representations of one of the methods employed in the ROM 83 of the present invention to reconcile a calculated position with that of a consistently used, "virtually known" base station point or position.

Referring now to FIG. 8, a flow chart for correction term data collection and determination, step 101 is first performed to calculate the position and velocity of the user receiver from raw radio navigation data. Step 102 determines if this raw calculated position is within a certain predetermined distance from a base station point stored in archival memory. An answer of no leads to step 103 which states there are no special correction terms to modify the raw data with and to use the position calculated from raw data as the navigation solution provided to the user.

An answer of yes to step 102 leads to step 104 which defines the base station point as the actual current position used in the user provided navigation solution for that particular cycle. Step 105 than calculates correction terms for immediate use of future navigation solutions. This is accomplished by using the base station point as the "truth" and calculating positional errors from the difference between the "true position" and the raw data position. Step 106 applies the correction terms to the user supplied navigation solution for a predetermined period of time or while the user receiver remains within a predefined geographical distance of the base station point location.

Referring now to FIG. 9, a flow chart for base station point determination, step 101 is called and the position and velocity of the user receiver is calculated from raw radio navigation data. Step 111 then determines if the user's velocity components are less then some predetermined value. This is a check to ensure that the vehicle is not moving. If the answer is no to this step, no further base station point determination is attempted. If the answer to step 111 is yes, step 112 then determines if the number of raw radio position calculations, taken while the vehicle is not in motion, exceeds some predetermined value. This step ensures that base station points are not set for random vehicle stopping locations such as stop lights. If the answer to step 112 is negative, no further base station point determination is attempted.

If the answer to step 112 is affirmative, step 113 stores the calculated position in memory for future use. Step 114 is then executed, in which a check is done to ensure that a predetermined number of continuously collected raw position calculations have been stored in memory. This is done to ensure that there exists enough position data to perform acceptable statistical analysis. If step 114 is executed and enough data does not exist, then no further base station point determination is attempted. If enough data does exist in the stored memory register, then step 115 is executed. Step 115 performs the coded statistical analysis; an example of which could be, but not necessarily limited to, Gaussian least squares.

Upon completion of step 115, step 116 places the best position estimate into a separate storage register reserved exclusively for the best position estimates of the same location class, i.e. estimates that are within a predetermined distance from each other. Step 117 is then executed, which determines if there are more then some predetermined number of best position estimates within any given location class register. If the answer is negative, no further base station point determination is attempted. Step 118 is then executed to reset the continuous cycle counter to zero. This ensures that multiple best position estimates are not generated from any given vehicle stoppage.

If the answer to step 117 is affirmative, step 119 is then performed which performs an additional round of statistical analysis on all best position estimates within a given location class register. An example of a technique for this analysis could be, but is not necessarily limited to, Gaussian least squares. Step 119 will produce an overall an overall best position estimate which is then defined as a valid base station point in step 120. Execution of step 120 completes the routine for base station point determination.

FIGS. 7, 8, and 9 illustrate a unique embodiment of a radio navigation LRU I/O device. Alternative embodiments could have other features or configurations including, but not limited to, multiple same signal radio navigation reception, multiple signal radio navigation reception, and mixed navigation systems. It is also contemplated that the radio navigation LRU I/O device may in fact have various forms, such as being a single chip or chipset, or being incorporated onto a larger chip or board as one of multiple functions on the chip or board.

Crash Detection LRU I/O Device

An additional embodiment of the present invention is a crash detection LRU I/O device specifically designed to fully utilize the optimized I/O management of the mobile computer architecture. FIG. 10, an illustration of the crash detection LRU I/O device, contains two depictions; one displays a preferred embodiment for a board layout and the second depicts sensor orientation information. As discussed in the background of related art, this LRU I/O device does not use a vehicle's air bag system and is fully self-contained to interface with the present invention.

Figure 10A:
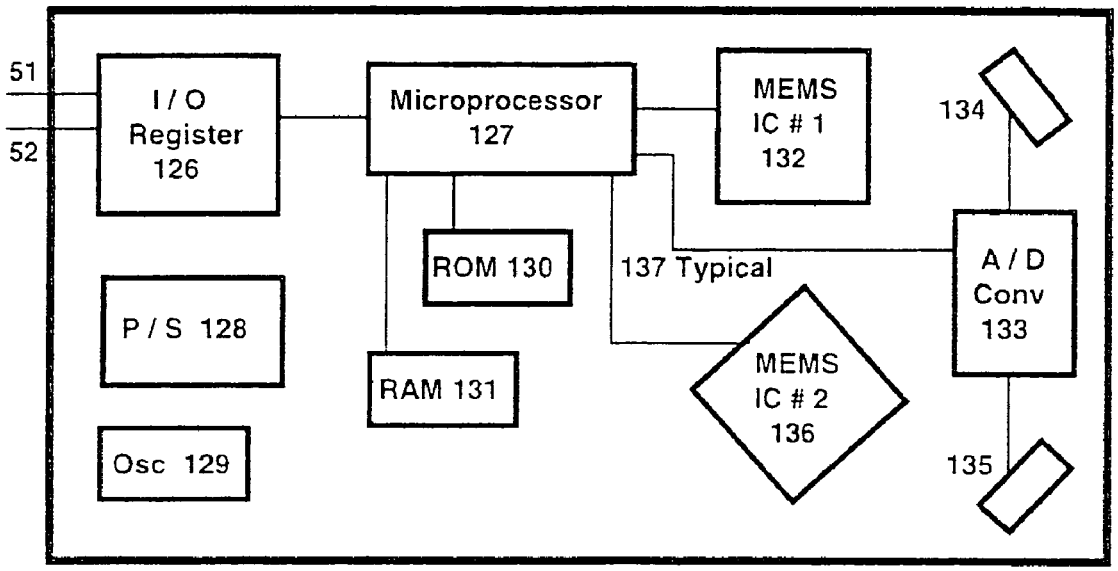
FIG. 10 is a block diagram illustrating a crash detection LRU I/O device card with accelerometer and/or strain gauge orientation.

Referring now to FIG. 10a, an illustration of an independent crash detection LRU I/O device, it can be seen that the whole line replaceable unit is defined as component 125. A data bus 51, defined previously in FIG. 4, provides data to and from the I/O processor 35 and the crash detection I/O register 126. Additionally, discrete lines 52, also defined previously in FIG. 4, relay discrete information between the I/O processor 35 and the crash detection I/O register 126. The crash detection I/O register 126 forwards information to the crash detection microprocessor 127. This information transfer is coordinated and passed over the crash detection data bus network 137.

The preferred embodiment of the crash detection LRU 125 will accurately determine if a vehicle accident, or crash, has occurred. The I/O device 125 accomplishes this task by sensing if a deceleration of the LRU unit is above some predetermined threshold value. Deceleration is calculated from information provided by accelerometers located on microelectro-mechanical sensors (MEMS) or from strain gauges. The present invention can employ both or either component and can also verify the direction and magnitude of the impacting force through the employment of at least two sensing units that are purposely skewed in relation to each other. The resulting crash detection data can than be forwarded onto emergency service providers to help the mobile user.

Referring again to FIG. 10a, the crash detection microprocessor 127 performs all the standard CPU functions. The crash detection microprocessor 127 is connected to the microelectro-mechanical sensor (MEMS) integrated circuits (ICs) 132 and 136 via the crash detection data bus network 137. Also connected to the network 137 is the Analog to Digital (A/D) converter 133, which in turn is connected to the first 134 and second 135 strain gauge instruments. The crash detection network 137 also allows the microprocessor 127 to interface with the crash memory modules. The Random Access Memory (RAM) module 131 may be composed of dynamic RAM (DRAM) or static RAM (SRAM). The Read Only Memory (ROM) 130 contains coded instructions which may be fixed in medium by a variety of means such as, but not limited to, programmable ROMs (PROM, EPROM, EEPROM), application specific integrated circuits (ASICs), or programmable logic devices (PLDs). Also found within the crash detection LRU 125 are other necessary system components such as power supplies and regulators 128 and oscillators 129. Power supplies could consist of various potential sources such as 12V DC and voltage regulation could be stepped down to various levels including, but not limited to, 5V or 3.3V. Oscillators could take various forms including, but not limited to, the temperature controlled crystal oscillator (TCXO).

Figure 10B:
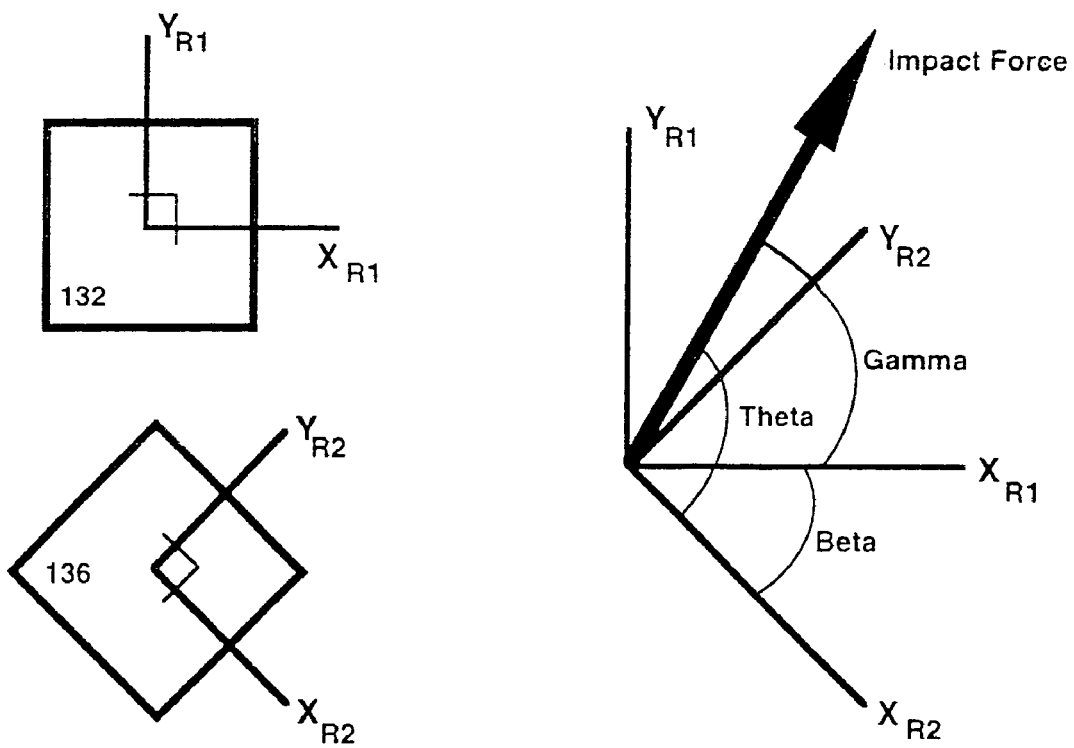

Referring now to FIG. 10b, it can be seen that either the two MEMS ICs 132 and 136, or the two strain gauges 134 and 135, or a combination of the two can be oriented such that there is some known skew angle, $\beta$, between the two components. Furthermore, the angle between the two units and the main assembly 3 can be set such that the orientation of an impacting force with respect to a vehicle's reference frame may be known. FIG. 10b denotes a reference frame for the first MEMS IC 132 as $X_{R1}$ and $Y_{R1}$ and a second reference frame for the second MEMS IC 136 as $X_{R2}$ and $Y_{R2}$. A sample impact force is depicted by an arrow; the angle between the impact vector and the first reference frame is defined as $\gamma$, and the angle between the impact vector and the second reference frame is defined as $\phi$. It is therefore possible to resolve the impact force vector into components in each reference frame as follows:

$X_{R1}$=(Impact Magnitude)cos $\gamma$ $Y_{R1}$=(Impact Magnitude)sin $\gamma$ $X_{R2}$=(Impact Magnitude)cos $\phi$ $Y_{R2}$=(Impact Magnitude)sin $\phi$ Since the relationship between the angle $\gamma$ and the angle $\phi$ is known in terms of angle $\beta$, it is possible to compare the impact force components sensed in one reference frame with that which was sensed in the second reference frame. This allows for redundant sensing abilities and a capability for sensor fault detection and identification. This in turn provides a safer and more robust system for the mobile user.

FIG. 10 illustrates a unique embodiment of a crash detection LRU I/O device. Other alternative embodiments could possess features or configurations including, but not limited to, three dimensional accelerometers and strain gauge set-ups and mixed crash detection systems. It is also contemplated that the crash detection LRU I/O device may in fact have various forms, such as being on a single chip or chipset, or being incorporated onto a larger chip or board as one of multiple functions on the chip or board.

What is claimed in the present invention is:

1. A processor implemented method of communicating data in a mobile environment comprising:
   at a unit comprising a processor and a processor readable storage medium in the mobile environment:
      persistently storing a unit unique hardware identification that identifies a specific hardware unit;
      receiving information via an external wireless signal at the unit;
      communicating a set of data extracted from the information received from the wireless signal to a separate computer system in the mobile environment via a data bus interface of the unit,
      wherein the persistently stored unit unique hardware identification is used to fully restrict access to information received at that unit via the wireless signal by determining if the unit is authorized to pass the information received at that unit via the wireless signal to the separate computer system via the data bus interface; and
   at the separate computer system in the mobile environment:
      receiving from the unit via a data bus interface the authorized set of data extracted from the information received from the wireless signal; and
      generating an output to a display at the separate computer system for a mobile user based on the authorized set of data.

2. The method of claim 1, wherein the wireless signal is a satellite signal.

3. The method of claim 1, further comprising communicating the unit unique hardware identification from the unit to the separate computer system.

4. The method of claim 1, wherein the unit comprises a wireless tuner unit and the computer system comprises a vehicle head unit.

5. The method of claim 1, wherein the wireless signal is a terrestrial signal.

6. The method of claim 1, further comprising:
sending a discrete signal from the separate computer system to the unit across a discrete line; and
receiving the discrete signal at the unit via the discrete line.

7. The method of claim 1, wherein the data bus interface uses wireless transmission.

8. The method of claim 1, wherein both the unit and the separate computer system are integrated into a single enclosure located in the mobile environment.

9. A mobile environment unit comprising:
at least one processor;
processor readable memory storing a set of processor executable instructions and a persistent unique hardware identification that identifies a specific hardware unit;
a data bus interface to transfer data authorized for use by a separate computer system to generate an output display for a mobile user;
wherein the unit is configured to:
receive information via an external wireless signal; and
communicate via the data bus interface a set of data extracted from the information received from the wireless signal, wherein the persistent unit unique hardware identification is used to fully restrict access to information received at the unit via the wireless signal by determining if the unit is authorized to pass the information received at that unit via the wireless signal to the data bus interface.

10. The unit of claim 9, wherein the unit sends the persistent unit unique hardware identification via the data bus interface.

11. The unit of claim 9, wherein the unit is configured to connect to a vehicle head unit via the data bus interface.

12. The unit of claim 9, wherein the unit is integrated into an enclosure.

13. The unit of claim 9, wherein the unit further comprises a discrete line interface to interface with a discrete line.

14. The unit of claim 9, wherein the data bus interface uses wireless transmission.

15. The unit of claim 9, wherein the wireless signal is a satellite signal.

16. The unit of 9, wherein the wireless signal is a terrestrial signal.

* * * * *